US012572026B2

(12) United States Patent
Hwang et al.

(10) Patent No.: US 12,572,026 B2
(45) Date of Patent: Mar. 10, 2026

(54) STEREOSCOPIC IMAGE DISPLAY DEVICE

(71) Applicant: SAMSUNG DISPLAY CO., LTD.,
Yongin-si (KR)

(72) Inventors: Young Goo Hwang, Yongin-si (KR);
Su Bin Jung, Yongin-si (KR)

(73) Assignee: SAMSUNG DISPLAY CO., LTD.,
Yongin-si (KR)

( * ) Notice: Subject to any disclaimer, the term of this
patent is extended or adjusted under 35
U.S.C. 154(b) by 298 days.

(21) Appl. No.: 18/317,028

(22) Filed: May 12, 2023

(65) Prior Publication Data

US 2024/0036349 A1     Feb. 1, 2024

(30) Foreign Application Priority Data

Jul. 26, 2022     (KR) ........................ 10-2022-0092779

(51) Int. Cl.
    *G02B 30/25*          (2020.01)
    *G02B 30/27*          (2020.01)
    *G09G 3/00*           (2006.01)
(52) U.S. Cl.
    CPC ............. *G02B 30/25* (2020.01); *G02B 30/27*
    (2020.01); *G09G 3/003* (2013.01)
(58) Field of Classification Search
    CPC ......... G02B 30/25; G02B 30/27; G09G 3/003
    USPC .......................................................... 349/15
    See application file for complete search history.

(56) References Cited

U.S. PATENT DOCUMENTS

| | | | | |
|---|---|---|---|---|
| 8,044,917 | B2 | 10/2011 | Oh et al. | |
| 8,487,917 | B2 | 7/2013 | Han et al. | |
| 9,728,118 | B2 * | 8/2017 | Park | G09G 3/3208 |
| 2009/0128474 | A1 * | 5/2009 | Ijzerman | H04N 13/359 |
| | | | | 345/94 |
| 2013/0135545 | A1 * | 5/2013 | Jung | G02B 30/28 |
| | | | | 349/200 |
| 2015/0109269 | A1 | 4/2015 | Sung et al. | |

FOREIGN PATENT DOCUMENTS

| | | |
|---|---|---|
| KR | 10-1281926 | 7/2013 |
| KR | 10-2015-0045135 | 4/2015 |
| KR | 10-2278326 | 7/2021 |

* cited by examiner

*Primary Examiner* — Michael H Caley
(74) *Attorney, Agent, or Firm* — F. CHAU &
ASSOCIATES, LLC

(57)          ABSTRACT

A stereoscopic image display device includes a display panel
that includes pixels, a polarization controller that generates
a first output voltage and a second output voltage, and a
polarization control layer that controls a path of light emitted
by the display panel, based on the first output voltage and the
second output voltage. The first output voltage has a first
voltage level in a first mode, and a second voltage level that
differs from the first voltage level in a second mode. The
second output voltage has the first voltage level in the first
mode, and has the first voltage level or a third voltage level
that differs from the first and second voltage levels in the
second mode.

19 Claims, 12 Drawing Sheets

1000

LS

LSA

DP

PX

Voxel(3D pixel)

<First Mode>

Vout1: Lv1
Vout2: Lv1

<Second Mode>

Vout1: Lv2
Vout2: Lv1 or Lv3

Vin: Vin1, Vin2, Vin3

STEREOSCOPIC IMAGE DISPLAY DEVICE

CROSS-REFERENCE TO RELATED APPLICATION

The present application claims priority to Korean patent application No. 10-2022-0092779, filed on Jul. 26, 2022 in the Korean Intellectual Property Office, the contents of which are herein incorporated by reference in their entirety.

TECHNICAL FIELD

Embodiments of the disclosure are directed to a stereoscopic image display device, and more particularly, to a stereoscopic image display device that displays a 3D image.

DISCUSSION OF THE RELATED ART

A stereoscopic image display device provides different images to left and right eyes of the viewer, so that the viewer can view a stereoscopic image by means of binocular parallax between the left and right eyes.

Recently, research has been conducted for a glass-free scheme in which a viewer does not wear stereoscopic glasses. A glass-free scheme includes a grating array scheme in which a left eye image and a right eye image are separated from each other by using a grating array, a lenticular scheme in which a left eye image and a right eye image are separated from each other by using a cylindrical lens array, a barrier scheme in which a left eye image and a right eye image are separated from each other by using a barrier, etc.

SUMMARY

Embodiments provide a stereoscopic image display device capable of reducing or minimizing power consumption.

In accordance with an embodiment of the present disclosure, a stereoscopic image display device includes a display panel that includes pixels, a polarization controller that generates a first output voltage and a second output voltage, and a polarization control layer that controls a path of light emitted by the display panel, based on the first output voltage and the second output voltage. The first output voltage has a first voltage level in a first mode, and has a second voltage level that differs from the first voltage level in a second mode, and the second output voltage has the first voltage level in the first mode, and has the first voltage level or a third voltage level that differs from the first and second voltage levels in the second mode.

A 2D image may be displayed from the stereoscopic image display device in the first mode, and a 3D image may be displayed from the stereoscopic image display device in the second mode.

The second voltage level may be higher than the first voltage level by a reference voltage difference, and the third voltage level may be higher than the second voltage level by the reference voltage difference.

The first voltage level may be a ground voltage.

The second voltage level may be a ground voltage.

In the second mode, a voltage level of the second output voltage cyclically repeats between the first voltage level and the third voltage level according to a predetermined cycle.

The polarization controller may include a switching control signal generator that generates a first switching control signal and a second switching control signal, a converter that generates the first output voltage, based on the first switching control signal, and a level shifter that generates the second output voltage, based on the second switching control signal.

The converter may include a boost-converter.

The converter may generate the first output voltage at the first voltage level that equals a ground voltage, based on the first switching control signal received in the first mode, and may generate the first output voltage at the second voltage level by converting a first input voltage, based on the first switching control signal received in the second mode.

The first switching control signal may be an enable signal. The converter may be turned off in response to the first switching control signal provided in the first mode, and may be turned on in response to the first switching control signal provided in the second mode.

The converter may include a buck-converter.

The converter may generate the first output voltage at the first voltage level by converting a first input voltage, based on the first switching control signal received in the first mode, and may generate the first output voltage at the second voltage level that equals a ground voltage, based on the first switching control signal received in the second mode.

The first switching control signal may be an enable signal. The converter may be turned on in response to the first switching control signal received in the first mode, and be turned off in response to the first switching control signal received in the second mode.

The level shifter may generate a second input voltage at the first voltage level as the second output voltage, based on the second switching control signal received in the first mode, and may generate the second input voltage at the first voltage level or a third input voltage at the third voltage level as the second output voltage, based on the second switching control signal received in the second mode.

In accordance with another embodiment of the present disclosure, a stereoscopic image display device may include a display panel that includes pixels, and a polarization control layer disposed on the display panel, where the polarization control layer controls a path of light emitted by the display panel. The polarization control layer includes a first electrode layer that receives a first output voltage, a second electrode layer that faces the first electrode layer and receives a second output voltage, and a liquid crystal layer disposed between the first electrode layer and the second electrode layer. The liquid crystal layer includes liquid crystal molecules whose alignment direction is controlled according to a voltage level of each of the first output voltage and the second output voltage. The first output voltage has a first voltage level in a first mode, and has a second voltage level that differs from the first voltage level in the second mode. The second output voltage has the first voltage level in the first mode, and has the first voltage level or a third voltage level that differs from the first and second voltage levels in the second mode.

The second voltage level may be higher than the first voltage level by a reference voltage difference, and the third voltage level may be higher than the second voltage level by the reference voltage difference.

The first voltage level may be a ground voltage.

The second voltage level may be a ground voltage.

In the second mode, a voltage level of the second output voltage cyclically repeats between the first voltage level and the third voltage level according to a predetermined cycle.

In the first mode, the liquid crystal molecules may be aligned to linearly polarize light emitted by the display panel in a horizontal direction. In the second mode, the liquid crystal molecules may be aligned to linearly polarize light emitted by the display panel in a vertical direction by means of an electric field that corresponds to the reference voltage difference.

BRIEF DESCRIPTION OF THE DRAWINGS

FIG. 12 is a block diagram of a stereoscopic image display device in accordance with embodiments of the present disclosure.

DETAILED DESCRIPTION

Figure 1:
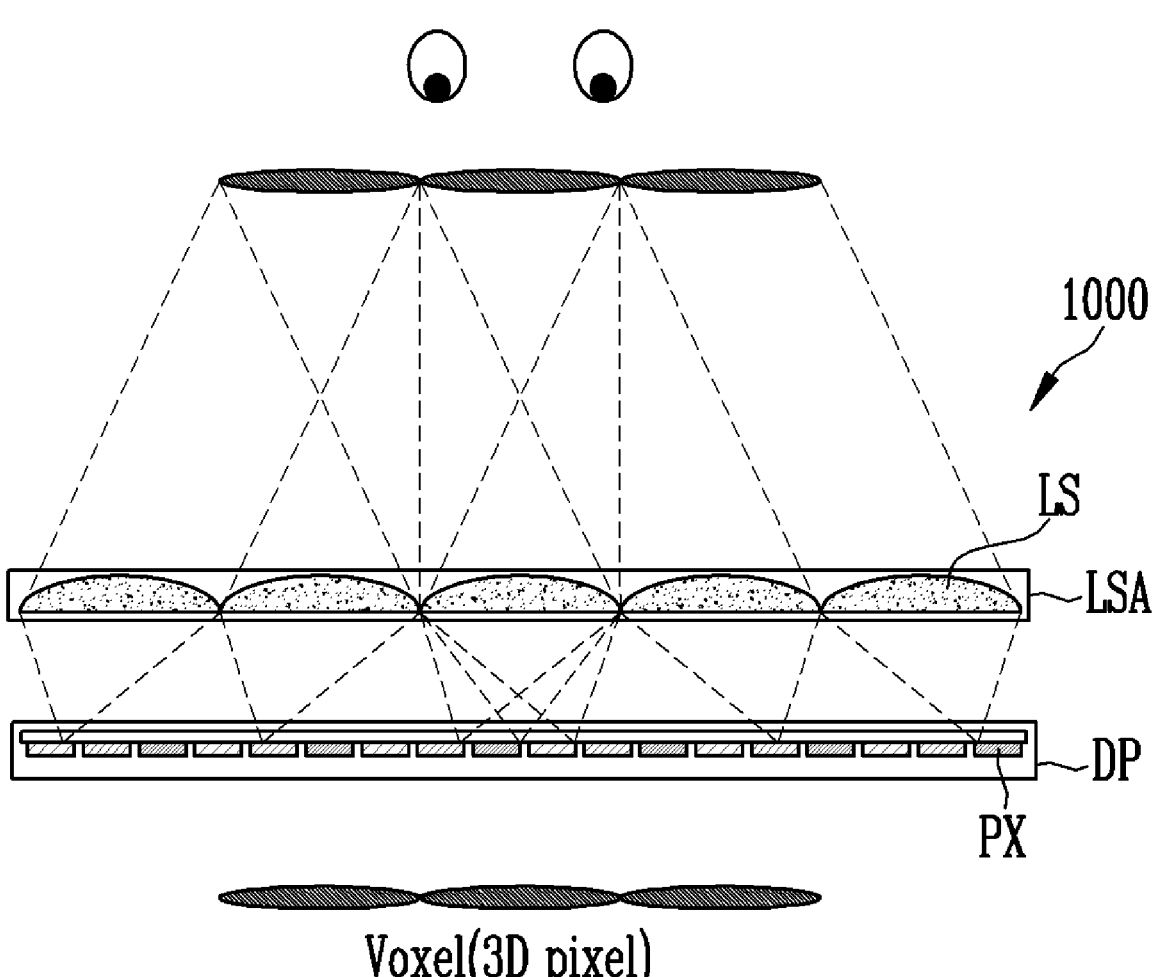
FIG. 1 illustrates a stereoscopic image display device in accordance with embodiments of the present disclosure.

Embodiments will now be described more fully hereinafter with reference to the accompanying drawings; however, embodiments may take different forms and should not be construed as limited to embodiments set forth herein. Like reference numerals may refer to like elements throughout.

In the specification, when an element is referred to as being "connected" or "coupled" to another element, it can be directly connected or coupled to the another element or be indirectly connected or coupled to the another element with one or more intervening elements interposed therebetween.

Further, an expression that an element such as a layer, region, substrate or plate is placed "on" or "above" another element indicates not only a case where the element is placed "directly on" or "just above" the other element but also a case where a further element is interposed between the element and the other element.

Hereinafter, exemplary embodiments of the present disclosure will be described in more detail with reference to the accompanying drawings.

FIG. 1 illustrates a stereoscopic image display device 1000 in accordance with embodiments of the present disclosure.

Referring to FIG. 1, in an embodiment, a light field display is a 3D display which implements a stereoscopic image by forming a light field that is expressed as a vector distribution (intensity and direction) of light in space, using a flat panel display and an optical element. The optical element is, for example, a lens array LSA of the stereoscopic image display device 1000. The light field display refers to a display technique in which a depth, a side, etc., of an object can be viewed, so that a more natural stereoscopic image can be implemented, which may be fused with virtual reality (VR) and augmented reality (AR), etc., to be expected to be applied in various aspects.

The light field can be implemented by various methods. For example, the light field is formed by a method of projecting light fields in several directions by using several projectors, a method of controlling a direction of light by using a grating, a method of adjusting a direction and an intensity (luminance) of light according to a combination of pixels by using two or more panels, a method of controlling a direction of light by using a pinhole or a barrier, or a method of controlling a refraction direction of light through a lens array, etc.

Hereinafter, for convenience of description, an embodiment will be mainly described in which a stereoscopic image is implemented by forming a light field by using a method of controlling a refraction direction of light through the lens array in the stereoscopic image display device 1000. However, and embodiments of the present disclosure are not necessarily limited thereto. For example, in some embodiments, the stereoscopic image display device 1000 forms a light field by controlling a refraction direction of light through at least one of the above-described methods.

In an embodiment, the stereoscopic image display device 1000 includes a display panel DP and the lens array LSA.

The display panel DP includes pixels PX that display an image by emitting light. In an embodiment, each of the pixels PX outputs one of red light, green light, or blue light. However, the color of light emitted from the pixels PX is not necessarily limited thereto. In some embodiment, light of other colors for full-color implementation is emitted from the pixels PX.

In an embodiment, the display panel DP is connected to a driving circuit that drives the pixels PX. The driving circuit is at least one of a scan driver, a data driver, or a timing controller. For example, the driving circuit is located on a rear surface of the display panel DP. The driving circuit, such as the scan driver, the data driver, the timing controller, etc., that drives the pixels PX will be described in detail with reference to FIG. 9.

In an embodiment, the pixels PX are disposed on a front surface of the display panel DP and form a light emitting surface, and an image is displayed through the pixels PX. The pixels PX are formed into a plurality of pixel rows and a plurality of pixel columns. Each of the pixel rows is a pixel group connected to the same scan line, and each of the pixel columns is a pixel group connected to the same data line.

In an embodiment, the display panel DP includes a pixel circuit layer and a display element layer that are disposed on a substrate and form the pixels PX. The display panel DP further includes an encapsulation structure that encapsulates the display element layer. Moreover, the display panel DP may further include a polarizing layer that includes a retarder and/or a polarizer on the encapsulation structure.

The pixel circuit layer includes a pixel circuit that drives a light emitting element of each pixel PX. For example, the pixel circuit layer includes transistors, signal lines and/or power lines connected to the transistors. The pixel circuit layer may have a stack structure that forms the transistors.

The display element layer is disposed on the pixel circuit layer. The display element layer includes light emitting elements. The light emitting elements are electrically connected to the pixel circuits. In an embodiment, the light emitting elements are self-luminous elements. The self-luminous element is one of an organic light emitting element, an inorganic light emitting element, or a light emitting element formed with a combination of an inorganic material and an organic material. For example, the display panel DP is a self-luminous display panel. However, embodiments are not necessarily limited thereto, and in some embodiments, the light emitting element includes a light emitting element such as a quantum dot display element that uses a quantum dot to change a wavelength of emitted light.

In addition, the display panel DP may be implemented as a liquid crystal display panel, a plasma display panel, a quantum-dot display panel, etc.

The stereoscopic image display device 1000 can operate in a 2D image display mode or a 3D image display mode. For example, the stereoscopic image display device 1000 can display a 2D image or a 3D image by controlling a path of light received from the display panel DP.

Figure 2:
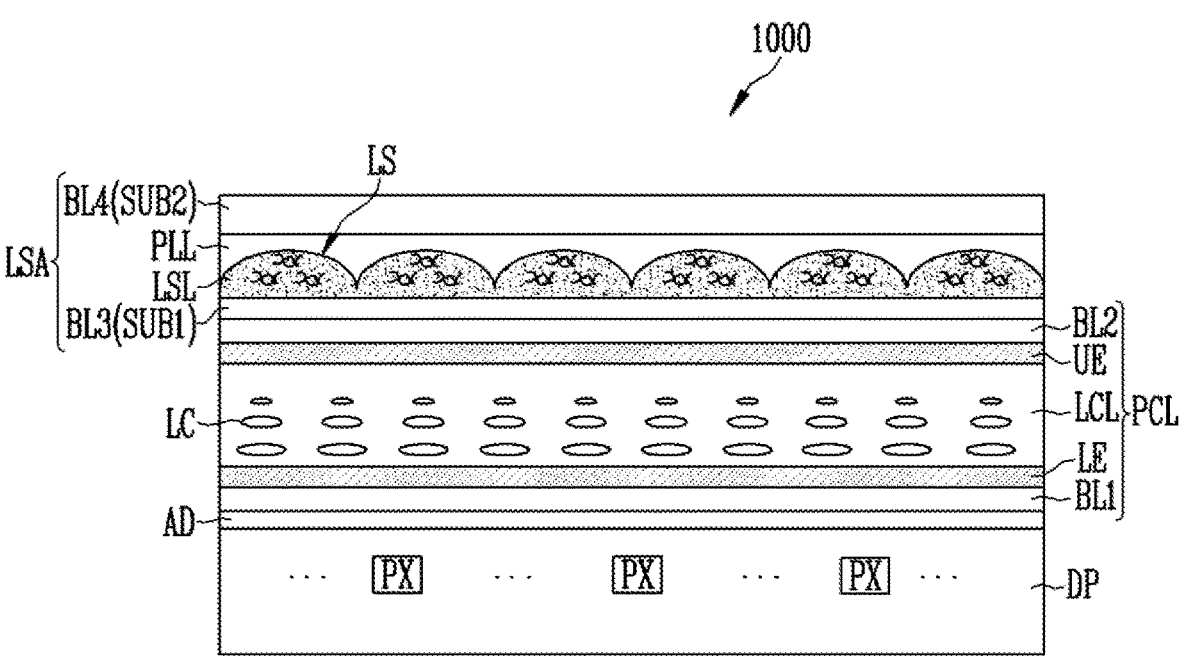
FIG. 2 is a sectional view of a stereoscopic image display device shown in FIG. 1.

In some embodiments, the stereoscopic image display device 1000 further includes a polarization control layer, such as a polarization control layer PCL shown in FIG. 2. The polarization control layer includes liquid crystal molecules whose alignment direction is controlled by an applied voltage or electric field. The alignment direction of the liquid crystal molecules is controlled by controlling a voltage or electric field applied to a liquid crystal layer according to an image display mode, so that the polarization control layer controls light incident from the display panel DP. For example, the polarization control layer polarizes light received from the display panel DP in a horizontal or vertical direction, thereby allowing the light to be transmitted therethrough.

Figure 3A:
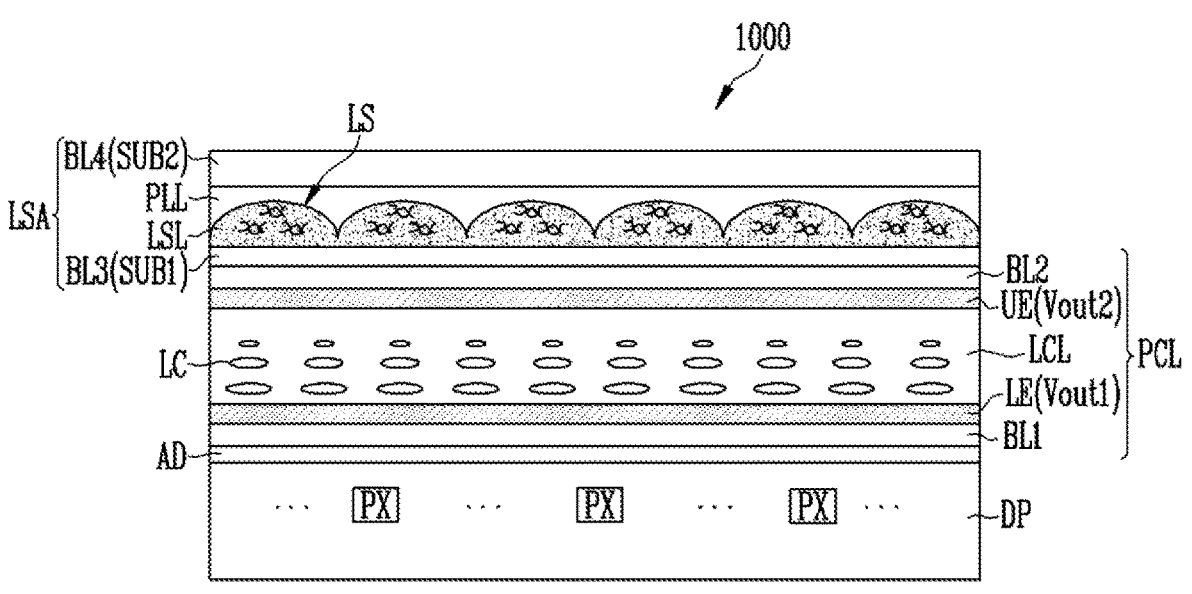
FIG. 3A illustrates a stereoscopic image display device shown in FIG. 2 being operated in a first mode.

A configuration in which the alignment direction of the liquid crystal molecules in the polarization control layer is controlled according to an image display mode will be described in detail with reference to FIGS. 3A and 3B.

The lens array LSA is disposed above the display panel DP, and includes lenses LS that refract light received from the pixels PX. For example, the lens array LSA is one of a lenticular lens array, a micro lens array, etc.

In an embodiment, as shown in FIG. 1, the stereoscopic image display device 1000 forms a light field, thereby displaying a stereoscopic 3D image. For example, the stereoscopic image display device 1000 forms a light field through the lens array LSA, thereby displaying a stereoscopic image.

A series of pixels PX are allocated to each lens LS, and light emitted from each pixel PX is refracted by the lens LS and propagates in only a specific direction, thereby forming a light field expressed with an intensity and a direction of the light. When a viewer views the stereoscopic image display device within the light field formed as described above, the viewer experiences a stereoscopic effect of a corresponding image.

Image information according to a viewpoint of the viewer within the light field is defined and processed in units of voxels (or referred to as "3 D pixel"). A voxel is a unit of graphic information that defines a predetermined point (or pixel) in a three-dimensional space.

A size and an arrangement of the lens LS are determined by conditions such as a size of the pixels PX, a viewing distance, a pixel size, a resolution, and a pixel arrangement structure.

In an embodiment, the lens LS includes a micro lenses instead of a lenticular lens. When viewed in a plan view, each micro lens has a shape such as one of a hexagonal shape, a circular shape, or an elliptical shape.

Figure 4:
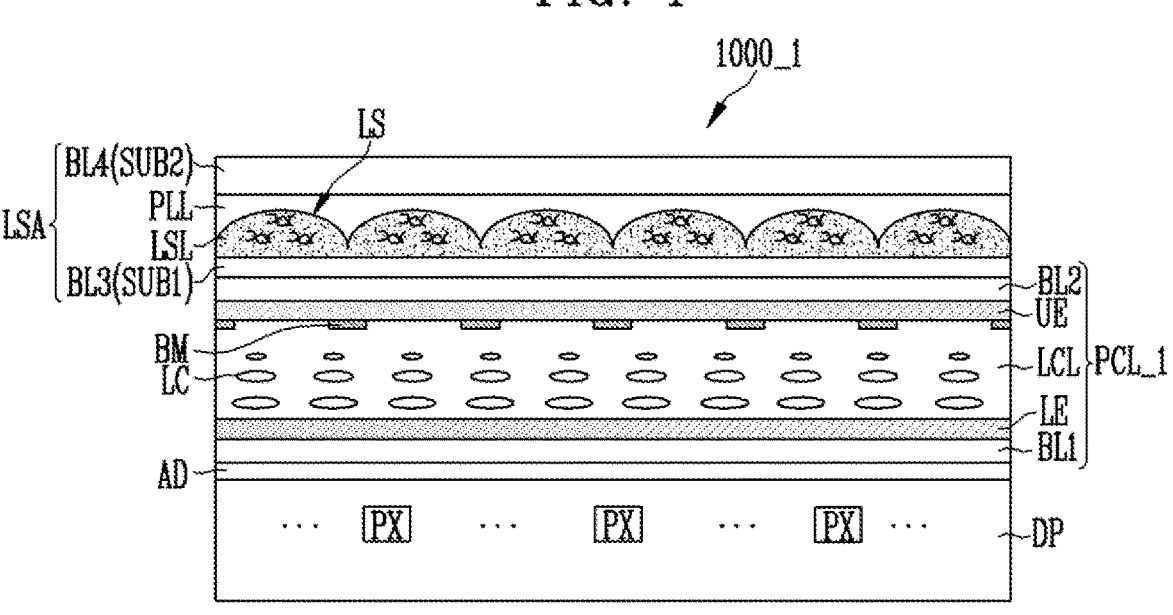
FIG. 4 is a sectional view of another stereoscopic image display device shown in FIG. 1.

In some embodiments, the influence of interference caused by diffraction of emitted light is large at a boundary between the lenses LS, and display quality can deteriorate due to crosstalk of a stereoscopic image due to the interference. In addition, image distortion may be additionally viewed due to lens aberration, etc. To reduce crosstalk and image distortion, a light blocking pattern, such as a light blocking pattern BM shown in FIG. 4, is disposed under the lens array LSA and overlaps with a boundary between adjacent lenses LS.

FIG. 2 is a sectional view of a stereoscopic image display device 1 000 shown in FIG. 1. FIG. 3A illustrates a stereoscopic image display device 1000 shown in FIG. 2 being operated in a first mode. FIG. 3B illustrates a stereoscopic image display device 1000 shown in FIG. 2 being operated in a second mode.

Referring to FIGS. 1 and 2, in an embodiment, the stereoscopic image display device 1000 includes a display panel DP, a polarization control layer PCL, and a lens array LSA.

The polarization control layer PCL is disposed between the lens array LSA and the display panel DP. The polarization control layer PCL controls polarization of light emitted from the display panel DP.

The polarization control layer PCL includes a first base layer BL1, a first electrode layer LE, hereinafter, referred to as a lower electrode layer, a liquid crystal layer LCL, a second electrode layer UE, hereinafter, referred to as an upper electrode layer, and a second base layer BL2.

The first base layer BL1 is disposed on the display panel DP. In an embodiment, the first base layer BL1 is attached to the display panel DP through a transparent adhesive material AD. The transparent adhesive material AD includes one of an optically clear adhesive (OCA) or an optically clear resin (OCR).

The first base layer BL1 includes a transparent insulating material. For example, the first base layer BL1 includes at least one organic material selected from polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose triacetate (SAC), or cellulose acetate propionate (CAP).

In an embodiment, the first base layer BL1 includes an inorganic material. For example, the first base layer BL1 includes at least one of a silicon nitride layer, a silicon oxynitride layer, a silicon oxide layer, a titanium oxide layer, an aluminum oxide layer, etc.

The first base layer BL1 is a lower substrate of the polarization control layer PCL. In an embodiment, the first base layer BL1 has a thickness of 0.3 mm. However, the thickness of the first base layer BL1 is not necessarily limited thereto. For example, the thickness of the first base layer BL1 is determined according to a design of the stereoscopic image display device 1000, or the polarization control layer PCL.

The lower electrode layer LE is disposed on the first base layer BL1. The lower electrode layer LE includes a transparent conductive material such as ITO. A first driving (or output) voltage that drives the liquid crystal layer LCL on or off is supplied to the lower electrode layer LE.

In an embodiment, the first driving voltage supplied to the lower electrode layer LE has a first voltage level in a 2D image display mode, or the first mode, and a second voltage level in a 3D image display mode, or the second mode. For example, the second voltage level is higher than the first voltage level. For example, the second voltage level is greater than the first voltage level by a reference voltage difference.

In an embodiment, at least one of a lower alignment layer and a lower insulating layer is further disposed on the lower electrode layer LE.

The upper electrode layer UE is disposed on the liquid crystal layer LCL and faces the lower electrode layer LE. The upper electrode layer UE includes a transparent conductive material such as ITO. A second driving (or output) voltage that drives the liquid crystal layer LCL on or off is supplied to the upper electrode layer UE.

In an embodiment, the second driving voltage supplied to the upper electrode layer UE has the first voltage level in the 2D image display (or first) mode, and has the first voltage level or a third voltage level in the 3D image display (or second) mode. For example, a voltage level of second driving voltage cyclically repeats between the first voltage level and a third voltage level in the 3D image display (or second) mode. For example, the third voltage level is higher than the second voltage level. For example, the third voltage level is greater than the second voltage level by the reference voltage difference.

However, embodiments are not necessarily limited thereto. In an embodiment, the second driving voltage is supplied to the lower electrode layer LE, and the first driving voltage is supplied to the upper electrode layer UE.

In an embodiment, at least one of an upper alignment layer or an upper insulating layer are further disposed between the upper electrode layer UE and the liquid crystal layer LCL.

The liquid crystal layer LCL is disposed between the lower electrode layer LE and the upper electrode layer UE. The liquid crystal layer LCL includes liquid crystal molecules LC whose alignment direction is controlled by a voltage applied to the upper electrode layer UE.

In an embodiment, the liquid crystal layer LCL is driven in a Twisted Nematic (TN) liquid crystal mode that has a phase difference of $\lambda/2$. However, embodiments are not necessarily limited thereto, and in an embodiment, the liquid crystal layer LCL is driven in a liquid crystal mode such as Vertical Alignment (VA), Optical Compensated Bend (OCB), or Electrically Controlled Birefringence (ECB).

For example, in a state in which no electric field is applied to the liquid crystal molecules LC in the TN liquid crystal mode, such as in the first mode as the 2D image display mode, the liquid crystal molecules LC are arranged or aligned to change linear polarization of incident light in a vertical direction to linear polarization in a horizontal direction by rotating the linear polarization in the vertical direction by 90 degrees. Accordingly, the liquid crystal layer LCL linearly polarizes in the horizontal direction light emitted from the display panel DP, thereby allowing the light to be transmitted therethrough. The light that is linearly polarized in the horizontal direction propagates to the lens array LSA, and an image is displayed in the 2D image display mode.

For example, further referring to FIG. 3A, in the 2D image display mode, hereinafter referred to as the first mode, a first output (or driving) voltage Vout1 that has a first voltage level Lv1 is supplied to the lower electrode layer LE, and a second output (or driving) voltage Vout2 that has the first voltage level Lv1 is supplied to the upper electrode layer UE. Since there is no voltage level difference between the first output voltage Vout1 and the second output voltage Vout2, no electric field is applied to the liquid crystal layer LCL. Accordingly, the liquid crystal molecules LC in the liquid crystal layer LCL are arranged (aligned) to change a vertical linear polarization of light to horizontal linear polarization by rotating the vertical linear polarization of light by 90 degrees, so the liquid crystal layer LCL linearly polarizes light emitted from the display panel DP in the horizontal direction, thereby allowing the light to be transmitted therethrough. The horizontally linearly polarized light propagates to the lens array LSA, so that a 2D image is displayed in the first mode.

On the other hand, in a state in which an electric field is applied to the liquid crystal molecules LC in the TN liquid crystal mode, such as in the second (or stereoscopic (3D) image display) mode, the liquid crystal molecules LC are arranged (aligned) to allow light incident to be transmitted through the formed electric field as is. For example, light that has a vertical polarizing axis that is emitted from the display panel DP is incident into the lens array LSA as is. Light refracted in the lens array LSA divides into an advancing path of light that corresponds to a right eye image and an advancing path of light that corresponds to a left eye image, and converge on different foci, so that a stereoscopic (3D) image is implemented.

For example, further referring to FIG. 3B, in the 3D image display mode, hereinafter referred to as the second mode, the first output (or driving) voltage Vout1 that has a second voltage level Lv2 is supplied to the lower electrode layer LE, and the second output (or driving) voltage Vout2 that has the first voltage level Lv1 or a third voltage level Lv3 is supplied to the upper electrode layer UE. A voltage level difference of the second voltage level Lv2 corresponds to the reference voltage difference from each of the first voltage level Lv1 and the third voltage level Lv3. For example, the second voltage level Lv2 is greater than the first voltage level Lv1 by the reference voltage difference, and is less than the third voltage level Lv3 by the reference voltage difference. As described above, since the first output voltage Vout1 and the second output voltage Vout2 have a voltage level difference that corresponds to the reference voltage difference, an electric field is applied to the liquid crystal layer LCL. Accordingly, the liquid crystal molecules LC in the liquid crystal layer LCL are arranged (aligned) to allow vertically polarized light to be transmitted through the formed electric field as is. The vertically polarized light propagates into the lens array LSA, light refracted in the lens array LSA divides into an advancing path of light that corresponds to a right eye image and an advancing path of light that corresponds to a left eye image, and converge on different foci, so that a stereoscopic (3D) image is implemented.

On the other hand, when the second output voltage Vout2 applied to the upper electrode layer UE has a constant voltage level, such as the first voltage level Lv1 or the third voltage level Lv3, in the second mode, the electric field applied to the liquid crystal layer LCL has the same direction when the stereoscopic image display device 1000 is driven in the second mode. Therefore, the liquid crystal molecules LC in the liquid crystal layer LCL may degrade. To prevent degradation of the liquid crystal molecules LC, a voltage level of the second output voltage Vout2 applied to the upper electrode layer UE cyclically repeats between a voltage level, such as the first voltage level, that is lower than the second voltage level of the first output voltage Vout1 applied to the lower electrode layer LE and a voltage level, such as the third voltage level, that is higher than the second voltage level. When the voltage level of the second output voltage Vout2 applied to the upper electrode layer UE cyclically changes, the direction of the electric field applied to the liquid crystal layer LCL cyclically reverses, so that degradation of the liquid crystal molecules LC can be prevented.

However, embodiments are not necessarily limited thereto. In some embodiments, the voltage level of the first output voltage Vout1 applied to the lower electrode layer LE cyclically changes in the second mode.

The second base layer BL2 is disposed on the upper electrode layer UE. For example, the second base layer BL2 is directly disposed on the upper electrode layer UE without any intermediate medium.

The second base layer BL2 includes a transparent insulating material. The second base layer BL2 includes a transparent organic material or a transparent inorganic material that is included in the above-described first base layer BL1. For example, the second base layer BL2 includes the same material as the first base layer BL1.

The second base layer BL2 is an upper substrate of the polarization control layer PCL. In an embodiment, a thickness of the second base layer BL2 that forms the upper substrate of the polarization control layer PCL and the thickness of the first base layer BL1 that forms the lower substrate of the polarization control layer PCL are substantially equal. For example, the thickness of the second base layer BL2 is 0.3 mm. However, embodiments are not necessarily limited thereto. For example, in some embodiments, the thickness of the second base layer BL2 is determined according to a design of the stereoscopic image display device 1000 or the polarization control layer PCL.

The lens array LSA forms a light field by refracting light received from the polarization control layer PCL. The lens array LSA includes a third base layer BL3 or a first substrate SUB1, a lens layer LSL, a planarization layer PLL, and a fourth base layer BL4 or a second substrate SUB2. The lens array LSA is directly disposed on the polarization control layer PCL without any intermediate medium.

The third base layer BL3 is disposed on the polarization control layer PCL or the second base layer BL2. For example, the third base layer BL3 is a substrate for forming/manufacturing the lens array LSA.

The third base layer BL3 includes a transparent insulating material. The third base layer BL3 includes a transparent organic material or a transparent inorganic material that is included in the above-described first base layer BL1. For example, the third base layer BL3 includes the same material as the first base layer BL1.

The third base layer BL3 forms a lower substrate of the lens array LSA. The third base layer BL3 has a thickness of 0.4 mm to 0.5 mm. However, embodiments are not necessarily limited thereto. For example, in some embodiments, the thickness of the third base layer BL3 is determined according to a design of the stereoscopic image display device 1000 or the lens array LSA.

On the other hand, when the lens layer LSL is formed by a fluidic liquid crystal polymer, the third base layer BL3 prevents the liquid crystal polymer from flowing out of a corresponding lens LS. For example, the third base layer BL3 prevents movement of the liquid crystal polymer during a manufacturing process.

The lens layer LSL is disposed on the third base layer BL3.

In an embodiment, the lens layer LSL includes an arrangement of lenses LS that have a semi-cylindrical convex cross-sectional shape. For example, the lens LS is a lenticular lens. However, embodiments are not necessarily limited thereto, and in some embodiments, the lens is formed as a micro lens with a micro-size area.

The lens layer LSL includes an optically anisotropic material. For example, the inside of the lens layer LSL includes reactive mesogen. For example, the lens layer LSL includes a mesogenic structure that forms a liquid crystal phase.

A material that fills the lens layer LSL is cured by reacting with light such as ultraviolet light, to form the liquid crystal phase. Accordingly, the inside of the lens layer LSL has a fixed phase that has an optical anisotropy. For example, the lens layer LSL has a major axis refractive index and a minor axis refractive index that differ from each other.

However, the material that forms the lens layer LSL is not limited thereto. For example, in some embodiments, the lens layer LSL includes a fluidic liquid crystal polymer. The fluidic liquid crystal polymer of the lens layer LSL aligns according to an electric field formed in the lens layer LSL. The lens array LSA is a liquid crystal type lens array.

The planarization layer PLL covers the lens layer LSL. The planarization layer PLL has a substantially flat top surface, and is made of an optically isotropic polymer.

For example, the planarization layer PLL includes an optically isotropic material that has a refractive index substantially equal to one of the major axis refractive index or the minor axis refractive index of the lens layer LSL.

When light received from the polarization control layer PCL oscillates along an axial direction that has a refractive index that differs from the refractive index of the planarization layer PLL, the light is refracted at an interface between the lens layer LSL and the planarization layer PLL and then emitted, based on a refractive index difference between the lens layer LSL and the planarization layer PLL. A stereoscopic image is displayed by the refraction of the emitted light.

When light received from the polarization control layer PCL oscillates along an axial direction that has the same refractive index as the lens layer LSL and the planarization layer PLL, the incident light is emitted with the same oscillation direction as the incident light.

As described above, a 3D image is implemented by a relationship between an oscillation direction of incident light provided to the lens array LSA and a refractive index of the lens layer LSL and the planarization layer PLL.

The fourth base layer BL4 is disposed on the planarization layer PLL. For example, the fourth base layer BL4 is a substrate for forming/manufacturing the lens array LSA. In addition, the fourth base layer BL4 protects components disposed on the bottom thereof in the lens array LSA from external pollution, impact, scratches, etc.

In an embodiment, the fourth base layer BL4 includes a transparent insulating material. The fourth base layer BL4 includes a transparent organic material or a transparent inorganic material that is included in the above-described first base layer BL1. For example, the fourth base layer BL4 includes the same material as the first base layer BL1.

The fourth base layer BL4 forms an upper substrate of the lens array LSA. In an embodiment, a thickness of the fourth base layer BL4 of the lens array LSA is substantially equal to the thickness of the third base layer BL3 of the lens array LSA. For example, the thickness of the fourth base layer BL4 is from 0.4 mm to 0.5 mm. However, embodiments are not necessarily limited thereto. For example, in some embodiments, the thickness of the fourth base layer BL4 is determined according to a design of the stereoscopic image display device 1000 or the lens array LSA.

In an embodiment, the lens array LSA that includes the lens layer LSL that includes the light-cured reactive mesogen and the planarization layer PLL has the form of a film.

FIG. 4 is a sectional view of another stereoscopic image display device 1000_1 shown in FIG. 1.

FIG. 4 illustrates a modification of an embodiment shown in FIG. 2 in relation to a light blocking pattern BM.

In FIG. 4, components different from those described above will be mainly described to avoid redundancy. In addition, identical reference numerals refer to identical components, and similar reference numerals refer to similar components.

Referring to FIGS. 1, 2, and 4, in an embodiment, a stereoscopic image display device 1000_1 includes a display panel DP, a polarization control layer PCL_1, a lens array LSA, and a light blocking pattern BM.

The light blocking pattern BM is disposed under the lens array LSA. The light blocking pattern BM overlaps a boundary between lenses LS. For example, the light blocking pattern BM extends along a boundary between the lenses LS that have a slanted arrangement.

In an embodiment, the light blocking pattern BM is formed on a top surface of the liquid crystal layer LCL and is in contact with a bottom surface of an upper electrode layer UE. The light blocking pattern BM is formed through a patterning process. The light blocking pattern BM absorbs or blocks light received through the liquid crystal layer LCL.

In an embodiment, a width of the light blocking pattern BM is less than 40% of a pitch of the lens LS. For example, the width of the light blocking pattern BM is from about 1% to about 2% of the pitch of the lens LS.

In an embodiment, the light blocking pattern BM includes an organic light blocking material. For example, the organic light blocking material includes at least one of carbon black (CB) or titan black (TiBK). However, embodiments of the present disclosure are not necessarily limited thereto.

A slit is formed between adjacent light blocking patterns BM, and optical interference such as diffraction occurs due to the slit. Therefore, a structure that reduces display quality deterioration due to the slit of the light blocking patterns BM is useful.

In an embodiment, the light blocking pattern BM includes fine slits that have an apodization structure that reduces diffraction at the boundary between adjacent lenses LS. For example, the apodization structure of the light blocking pattern BM decreases a high-order diffraction phase, and interference caused by diffraction and crosstalk caused by lens aberration can be further reduced.

Figure 5:
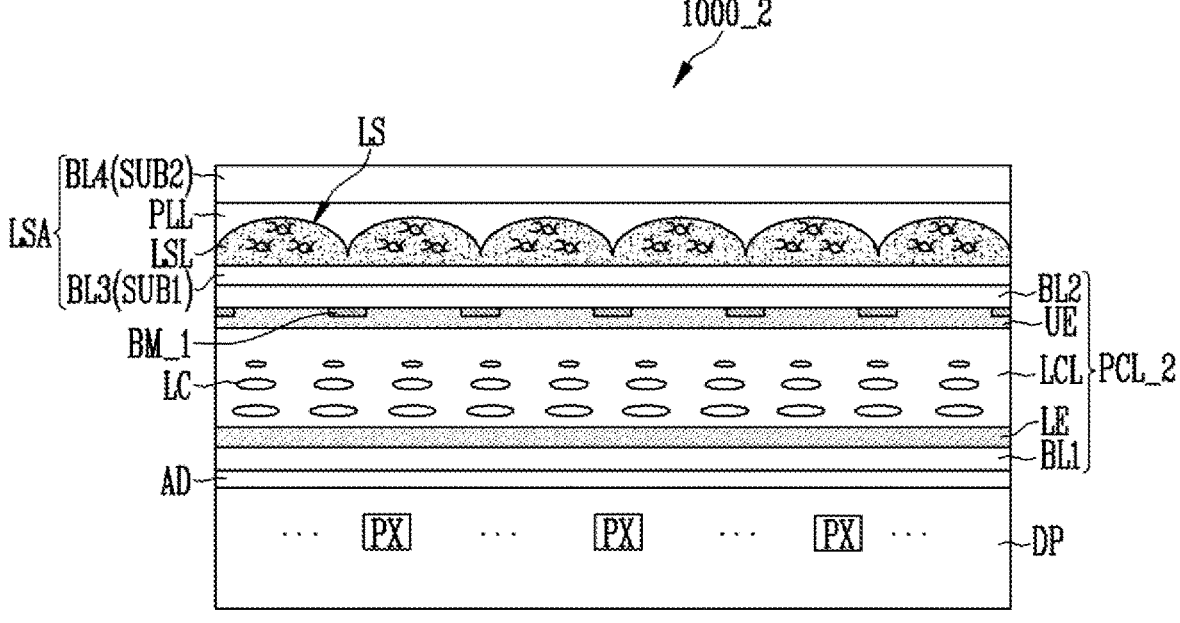
FIG. 5 is a sectional view of another stereoscopic image display device shown in FIG. 1.

FIG. 5 is a sectional view of another stereoscopic image display device 1000_2 shown in FIG. 1.

FIG. 5 illustrates a modification of an embodiment of FIG. 4 in relation to a light blocking pattern BM_1.

In FIG. 5, components that differ from those described above will be mainly described to avoid redundancy. In addition, identical reference numerals refer to identical components, and similar reference numerals refer to similar components.

Referring to FIGS. 1, 2, 4, and 5, in an embodiment, a stereoscopic image display device 1000_2 includes a display panel DP, a polarization control layer PCL_2, a lens array LSA, and a light blocking pattern BM_1.

The light blocking pattern BM_1 is disposed under the lens array LSA. The light blocking pattern BM_1 overlaps a boundary between lenses LS.

In an embodiment, the light blocking pattern BM_1 is in contact with a top surface of an upper electrode layer UE. For example, the light blocking pattern BM_1 is in direct contact with a bottom surface of a second base layer BL2 that forms an upper substrate of the polarization control layer PCL_2.

For example, after the light blocking pattern BM_1 is patterned at the bottom surface of the second base layer BL2, the upper electrode layer UE is deposited or printed on the bottom surface of the second base layer BL2 on which the light blocking pattern BM_1 is patterned.

As described above, the light blocking pattern BM_1 is selectively formed at various positions according to a process condition, a pitch of the lens LS, a thickness, etc.

Figure 6:
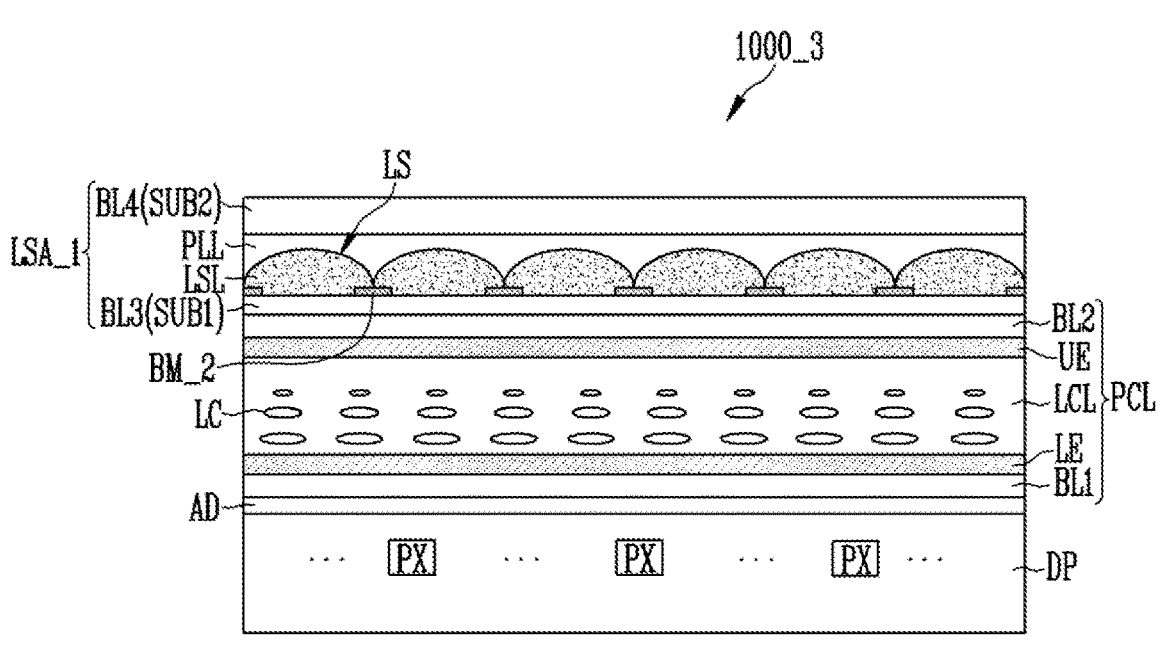
FIG. 6 is a sectional view of another stereoscopic image display device shown in FIG. 1.

FIG. 6 is a sectional view of another stereoscopic image display device 1000_3 shown in FIG. 1.

FIG. 6 illustrates a modification of an embodiment shown in FIG. 4 in relation to a light blocking pattern BM_2.

In FIG. 6, components different from those described above will be mainly described to avoid redundancy. In addition, identical reference numerals refer to identical components, and similar reference numerals refer to similar components.

Referring to FIGS. 1, 2, 4, and 6, in an embodiment, a stereoscopic image display device 1000_3 includes a display panel DP, a polarization control layer PCL, a lens array LSA_1, and a light blocking pattern BM_2.

In an embodiment, the light blocking pattern BM_2 is in contact with a top surface of a third base layer BL3, and is in contact with a lens layer LSL. For example, after the light blocking pattern BM_2 is patterned on the top surface of the third base layer BL3, the lens layer LSL and the third base layer BL3 are coupled to each other.

As described above, the light blocking pattern BM_2 is selectively formed at various positions according to a process condition, a pitch of the lens LS, a thickness, etc.

Figure 7:
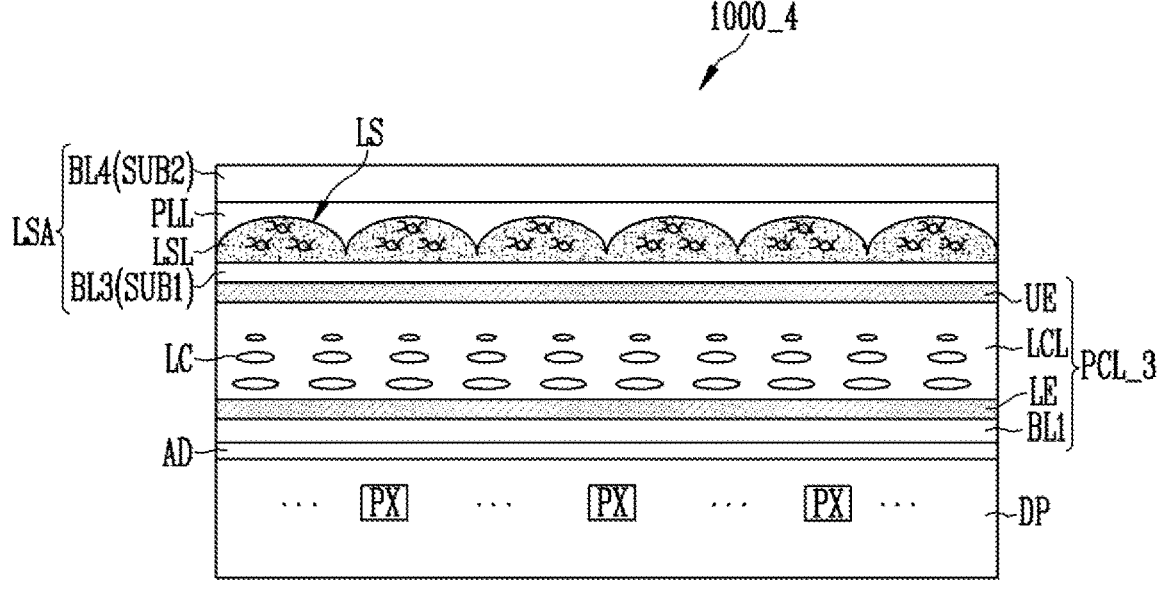
FIG. 7 is a sectional view of another stereoscopic image display device shown in FIG. 1.

FIG. 7 is a sectional view of another stereoscopic image display device 1000_4 shown in FIG. 1.

FIG. 7 illustrates a modification of an embodiment shown in FIG. 2 in relation to a polarization control layer PCL_3.

In FIG. 7, components different from those described above will be mainly described to avoid redundancy. In addition, identical reference numerals refer to identical components, and similar reference numerals refer to similar components.

Referring to FIGS. 1, 2, and 7, in an embodiment, a stereoscopic image display device 1000_4 includes a display panel DP, a polarization control layer PCL_3, and a lens array LSA.

The polarization control layer PCL_3 includes a first base layer BL1, a first (or lower) electrode layer LE, a liquid crystal layer LCL, and a second (or upper) electrode layer UE.

The lens array LSA includes a third base layer BL3, a lens layer LSL, a planarization layer PLL, and a fourth base layer BL4.

The third base layer BL3 is disposed on the upper electrode layer UE. For example, the third base layer BL3 may be directly disposed on the upper electrode layer UE without any intermediate medium. In an embodiment, the upper electrode layer UE is deposited or printed on a bottom surface of the third base layer BL3.

As described above, when the third base layer BL3 is directly disposed on the upper electrode layer UE, the third base layer BL3 forms both an upper substrate of the polarization control layer PCL_3 and a lower substrate of the lens array LSA.

In an embodiment, a thickness of each of the first base layer BL1, the third base layer BL3, and the fourth base layer BL4 is 0.5 mm. However, embodiments are not necessarily limited thereto. For example, in an embodiment, the thickness of each of the first base layer BL1, the third base layer BL3, and the fourth base layer BL4 is determined according to a design of the stereoscopic image display device 1000_4.

As described with reference to FIG. 7, when the lens array LSA or the third base layer BL3 is directly disposed on the upper electrode layer UE of the polarization control layer PCL_3, the third base layer BL3 forms both the upper substrate of the polarization control layer PCL_3 and the lower substrate of the lens array LSA. For example, the lens array LSA and the polarization control layer PCL_3 share the third base layer BL3, so that the entire thickness of the stereoscopic image display device 1000_4 can be decreased. A focal distance from a pixel PX to a lens LS can also be decreased.

The focal distance determines an optical characteristic such as a viewing angle of a stereoscopic image. As the focal distance decreases the viewing angle increases, and the image quality of the stereoscopic image increases.

The stereoscopic image display device 1000_4 in accordance with embodiments of the present disclosure has a structure in which the lens array LSA that includes the lens layer LSL is directly disposed on the upper electrode layer UE of the polarization control layer PCL3, so that the base layer, such as the second base layer BL2 shown in FIG. 2, that forms the upper substrate of the polarization control layer PCL_3 is removed, and the thickness of an optical structure on the top of the display panel DP can be decreased. Accordingly, since the focal distance that implements the stereoscopic image is decreased, the viewing angle is widened, and the quality of the stereoscopic image is increased.

In addition, since an optical bonding process that attached the lower substrate, such as the third base layer BL3, of the lens array LSA to the upper substrate of the polarization control layer PCL_3 is omitted, manufacturing processes can be simplified, and manufacturing cost can be reduced.

Figure 8:
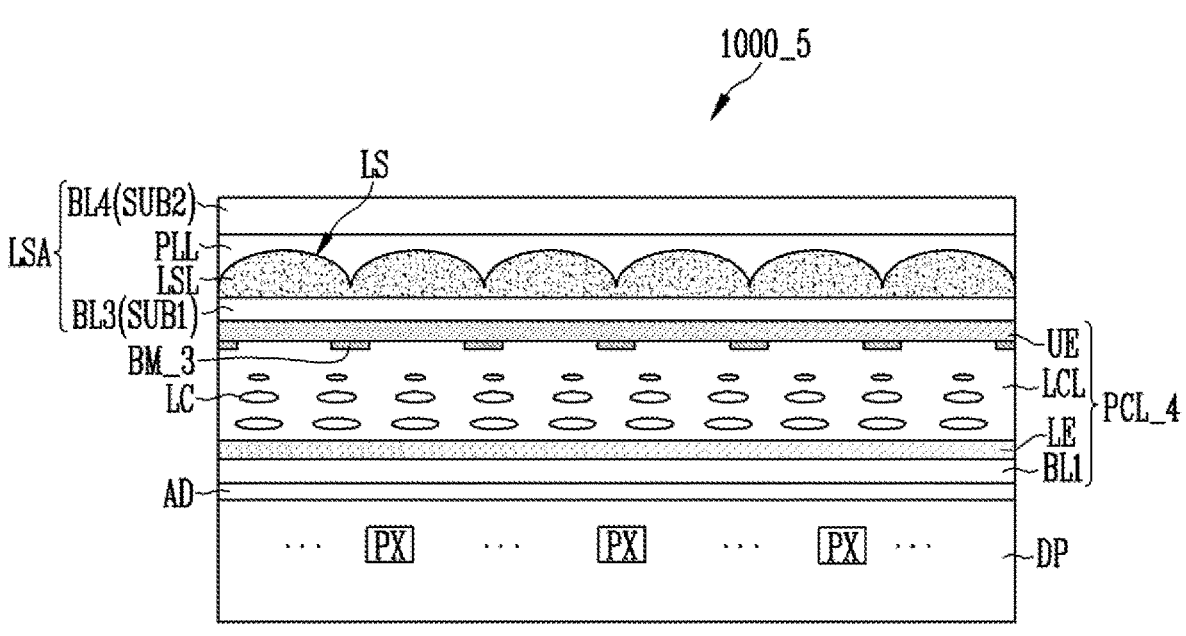
FIG. 8 is a sectional view of another stereoscopic image display device shown in FIG. 1.
Figure 9:
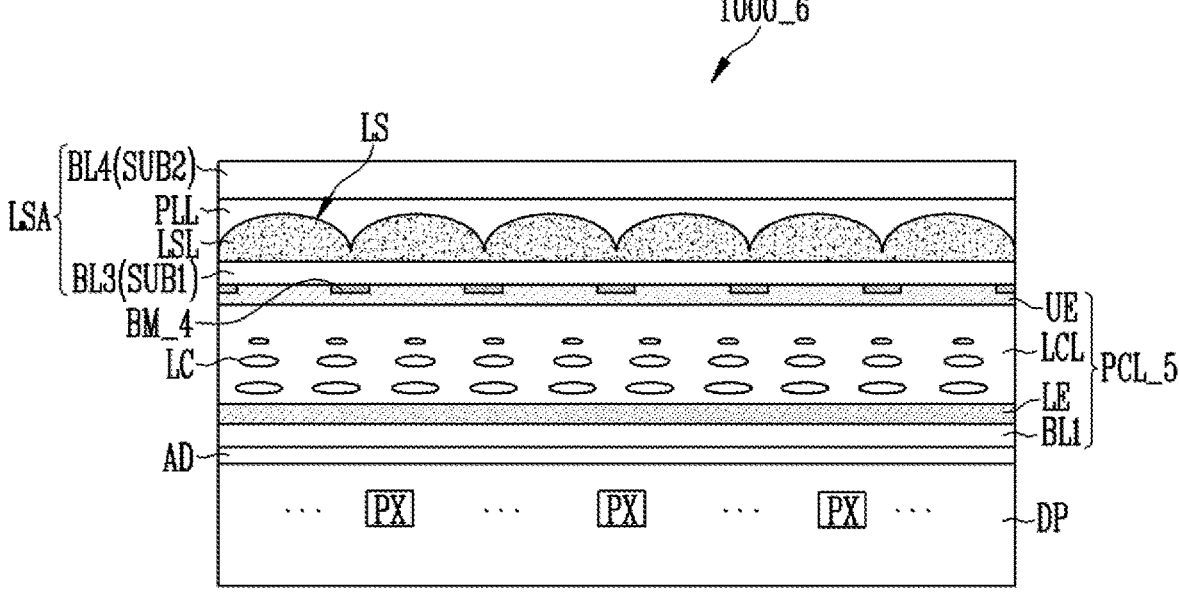
FIG. 9 is a sectional view of another stereoscopic image display device shown in FIG. 1.
Figure 10:
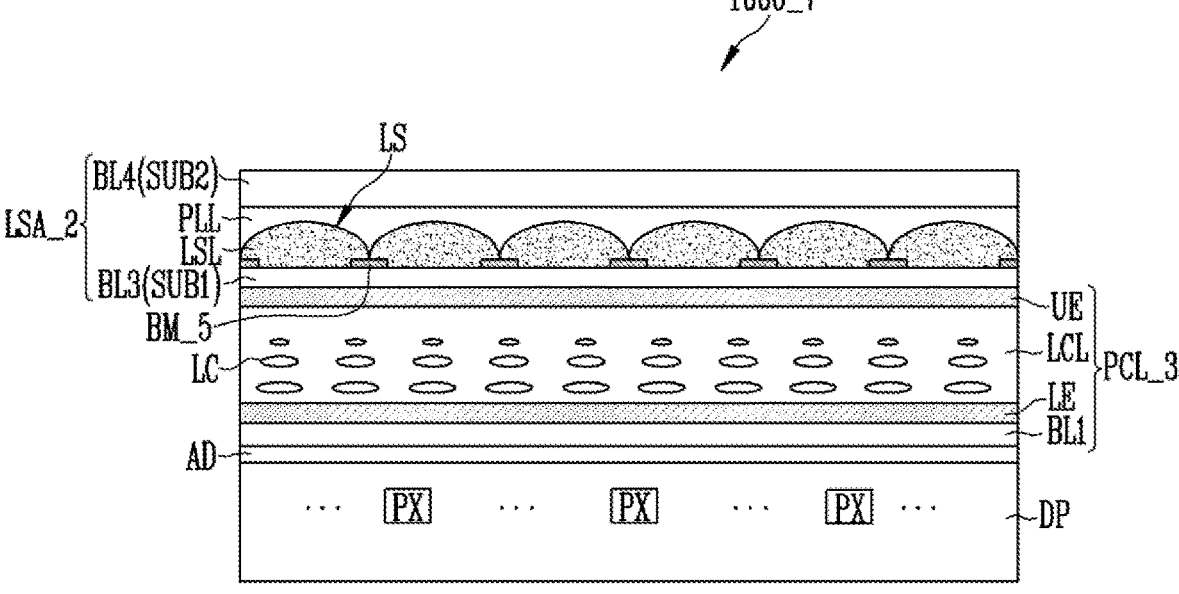
FIG. 10 is a sectional view of another stereoscopic image display device shown in FIG. 1.

FIG. 8 is a sectional view of another stereoscopic image display device 1000_5 shown in FIG. 1. FIG. 9 is a sectional view of another stereoscopic image display device 1000_6 shown in FIG. 1. FIG. 10 is a sectional view of another stereoscopic image display device 1000_7 shown in FIG. 1.

FIGS. 8 to 10 illustrate modifications of an embodiment shown in FIG. 7 in relation to light blocking patterns BM_3, BM_4, and BM_5, respectively.

In FIGS. 8 to 10, components different from those described above will be mainly described to avoid redundancy. In addition, identical reference numerals refer to identical components, and similar reference numerals refer to similar components.

Referring to FIGS. 1, 2, 7, and 8, in an embodiment, the stereoscopic image display device 1000_5 includes a display panel DP, a polarization control layer PCL_4, a lens array LSA, and a light blocking pattern BM_3.

In an embodiment, as shown in FIG. 8, the light blocking pattern BM_3 is disposed on a bottom surface of an upper electrode layer UE and a top surface of the liquid crystal layer LCL. For example, after the light blocking pattern BM_3 is patterned on the bottom surface of the upper electrode layer UE, a liquid crystal layer LCL is provided.

In addition, further referring to FIG. 9, a stereoscopic image display device 1000_6 includes a display panel DP, a polarization control layer PCL_5, a lens array LSA, and a light blocking pattern BM_4.

In an embodiment, as shown in FIG. 9, the light blocking pattern BM_4 is disposed on a bottom surface of a third base layer BL3. The light blocking pattern BM_4 is in contact with an upper surface of an upper electrode layer UE. For example, after the light blocking pattern BM_4 is patterned on the bottom surface of the third base layer BL3, the upper electrode layer UE is deposited or printed on a bottom surface of the third base layer BL3.

In addition, further referring to FIG. 10, a stereoscopic image display device 1000_7 includes a display panel DP, a polarization control layer PCL_3, a lens array LSA_2, and a light blocking pattern BM_5.

In an embodiment, as shown in FIG. 10, the light blocking pattern BM_5 is disposed on and in contact with a top surface of a third base layer BL3. Also, the light blocking pattern BM_5 is in contact with bottom surface of a lens layer LSL. For example, after the light blocking pattern BM_5 is patterned on the top surface of the third base layer BL3, the lens layer LSL and the third base layer BL3 are coupled to each other.

As described above, the light blocking patterns BM_3, BM_4 or BM_5 are selectively formed at various positions according to a process condition, a pitch of a lens LS, a thickness, etc.

Figure 11:
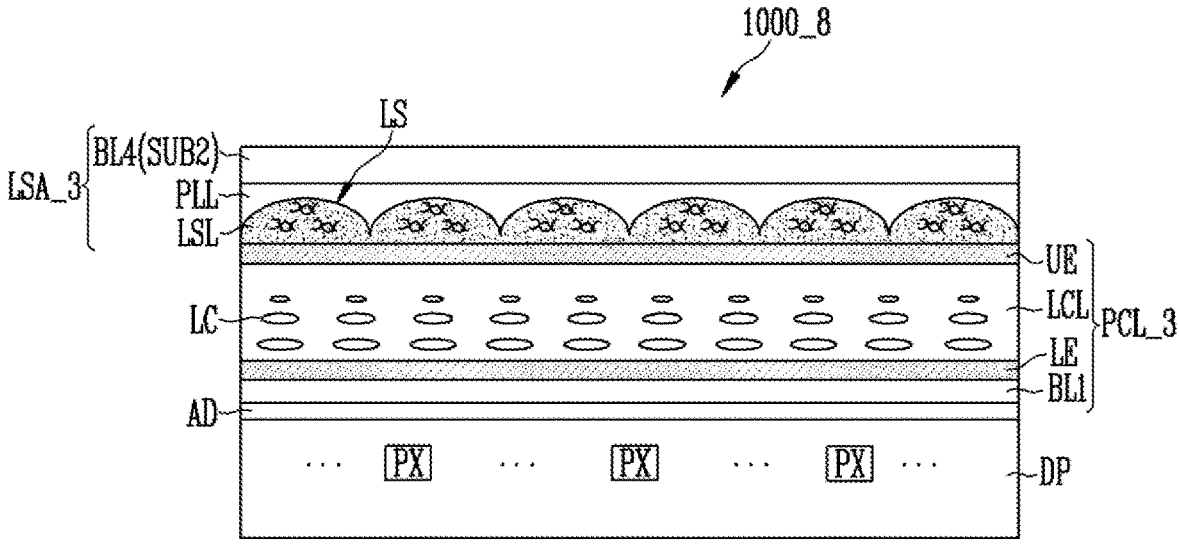
FIG. 11 is a sectional view of another stereoscopic image display device shown in FIG. 1.

FIG. 11 is a sectional view of another stereoscopic image display device 1000_8 shown in FIG. 1.

FIG. 11 illustrates a modification of an embodiment shown in FIG. 2 in relation to a lens array LSA_3.

In FIG. 11, components different from those described above will be mainly described to avoid redundancy. In addition, identical reference numerals refer to identical components, and similar reference numerals refer to similar components.

Referring to FIGS. 1, 2, 7, and 11, in an embodiment, a stereoscopic image display device 1000_8 includes a display panel DP, a polarization control layer PCL_3, and a lens array LSA_3.

The polarization control layer PCL_3 includes a first base layer BL1, a first (or lower) electrode layer LE, a liquid crystal layer LCL, and a second (or upper) electrode layer UE.

The lens array LSA_3 includes a lens layer LSL, a planarization layer PLL, and a fourth base layer BL4.

The lens array LSA_3 is directly disposed on the polarization control layer PCL_3 without any intermediate medium.

In an embodiment, the lens layer LSL is directly disposed on the upper electrode layer UE. For example, a material that forms the upper electrode layer UE is deposited directly on a bottom surface of the lens layer LSL.

As described with reference to FIG. 11, when the lens array LSA_3 is directly disposed on the upper electrode layer UE of the polarization control layer PCL_3, a substrate between the lens array LSA_3 and the polarization control layer PCL_3 can be removed, and the thickness of an optical structure on the top of the display panel DP can be decreased. Accordingly, the entire thickness of the stereoscopic image display device 1000_8 can be decreased. A focal distance from a pixel PX to a lens LS is also decreased. In particular, a viewing angle is increased by a decrease in focal distance due to the decrease in thickness of the lens array LSA_3.

In addition, since an optical bonding process that attached substrates between the lens array LSA_3 and the polarization control layer PCL_3 to each other is omitted, manufacturing processes can be simplified, and manufacturing cost can be reduced.

Figure 12:
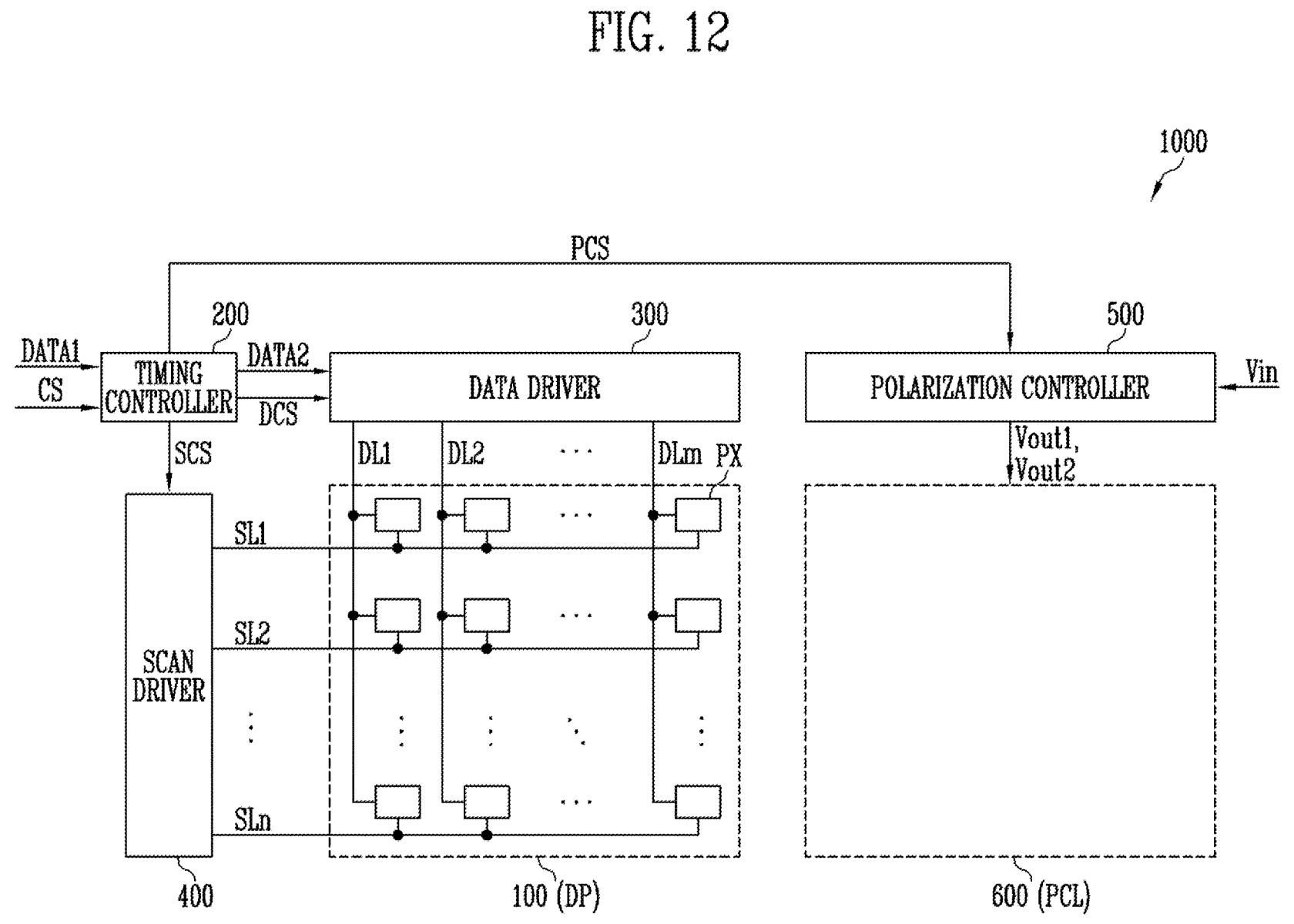

FIG. 12 is a block diagram of a stereoscopic image display device 1000 in accordance with embodiments of the present disclosure.

Referring to FIG. 12, the stereoscopic image display device 1000 in accordance with the embodiments of the present disclosure includes a display panel 100 (DP), a timing controller 200, a data driver 300, and a scan driver 400. In an embodiment, the stereoscopic image display device 1000 further includes a polarization control layer 600 (PCL) and a polarization controller 500.

The display panel 100 (DP) includes a plurality of scan lines SL1 to SLn, where n is an integer greater than 0, a plurality of data lines DL1 to DLm, where m is an integer greater than 0, and a plurality of pixels PX.

Each of the pixels PX is connected to at least one of the scan lines SL1 to SLn and at least one of the data lines DL1 to DLm. Each of the pixels PX emits light with a luminance that corresponds to a data signal received through a corresponding data line in response to a scan signal received through a corresponding scan line. In addition, the pixels PX are supplied with voltages of a first power source and a second power source. For example, the voltages of the first power source and the second power source are needed to operate the pixels PX. For example, the first power source has a voltage level higher than a voltage level of the second power source. For example, the voltage of the first power source is a positive voltage, and the voltage of the second power source is a negative voltage.

In some embodiments, the display panel 100 (DP) is substantially identical to the display panel DP described with reference to FIGS. 1 to 11.

The timing controller 200 receives a control signal CS and first data DATA1 from an external source, such as a graphics processor. The control signal CS includes a clock signal, a vertical synchronization signal, a horizontal synchronization signal, etc.

The timing controller 200 generate a first (or scan) control signal SCS and a second (or data) control signal DCS, based on the control signal CS. The timing controller 200 provides the first control signal SCS to the scan driver 400 and provides the second control signal DCS to the data driver 300.

The first control signal SCS includes a scan start signal, a scan clock signal, etc. The scan start signal controls a timing of a scan signal. The scan clock signal is used to shift the scan start signal.

The second control signal DCS includes a source start signal, a data clock signal, etc. The source start signal controls a sampling start time of data. The data clock signal controls a sampling operation.

The timing controller 200 generates second data DATA2, based on the control signal CS and the first data DATA1, and provides the second data DATA2 to the data driver 300.

The scan driver 400 receives the first control signal SCS from the timing controller 200, and supplies scan signals to the scan lines SL1 to SLn, based on the first control signal SCS. For example, the scan driver 400 sequentially supplies scan signals that have a turn-on pulse to the scan lines SL1 to SLn. For example, the scan driver 400 includes scan stages in the form of shift registers, and generates the scan signals that sequentially transmit the scan start signal in the form of the turn-on pulse to a next scan stage under the control of the scan clock signal.

When the turn-on level scan signals are sequentially transmitted, pixels PX are selected in a horizontal line (or pixel row) unit, and a data signal is supplied to the selected pixels PX. For example, the turn-on level scan signal is set to a gate-on voltage, which is a low voltage or a high voltage, such that a transistor in each of the pixels PX that receives a scan signal can be turned on.

The data driver 300 receives the second data DATA2 and the second control signal DCS from the timing controller 200, and supplies data signals or voltages that correspond to the second data DATA2 to the data lines DL1 to DLm in response to the second control signal DCS. The data signals supplied to the data lines DL1 to DLm are supplied to the pixels PX selected by the scan signals. For example, the data driver 300 supplies the data signals to the data lines DL1 to DLm to be synchronized with the turn-on level scan signal.

In some embodiments, the timing controller 200 controls the display panel 100 (DP) to display a 2D image in a first (or 2D image display) mode, and to display a 3D image in a second (or 3D image display) mode. For example, a 2D image that corresponds to the first mode is displayed on the display panel 100 (DP) based on second data DATA2 transmitted from the timing controller 200 to the data driver 300, and a 3D image that corresponds to the second mode is displayed on the display panel 100 (DP), based on second data DATA2 transmitted from the timing controller 200 to the data driver 300.

In an embodiment, the timing controller 200 generates a polarization control signal PCS that controls an operation of the polarization controller 500, and provides the polarization control signal PCS to the polarization controller 500. For example, the polarization control signal PCS has two logic levels, but embodiments are not necessarily limited thereto.

In an embodiment, the polarization controller 500 determines whether an image display mode is the first mode or the second mode, based on a logic level of the polarization control signal PCS, and generates and outputs a first output (or driving) voltage Vout1 and a second output (or driving) voltage Vout2 that have voltage levels that correspond to the respective mode, based on an input voltage Vin. The input voltage Vin is a DC voltage received from an external source, such as an external power device, a battery, etc. The input voltage Vin includes a first input voltage Vin1, a second input voltage Vint and a third input voltage Vin3 shown in FIG. 13. The first output voltage Vout1 and the second output voltage Vout2 are provided to the polarization control layer 600 (PCL).

In some embodiments, the polarization control layer 600 (PCL) is substantially identical to the polarization control layer described with reference to FIGS. 1 to 11.

In an embodiment, the polarization controller 500 determines whether the image display mode is the first mode or the second mode, based on the polarization control signal PCS. For example, when a first logic level polarization control signal PCS is received, the polarization controller 500 determines that the image display mode is the first mode in which a 2D image is displayed. When a second logic level polarization control signal PCS is received, the polarization controller 500 determines that the image display mode is the second mode in which a 3D image is displayed.

In an embodiment, when it is determined that the image display mode is the first mode, based on the first logic level polarization control signal PCS, the polarization controller 500 generates and outputs the first output voltage Vout1 and the second output voltage Vout2 that have the same voltage level. As described with reference to FIGS. 2 and 3A, since there is no voltage level difference in the first mode between the first output voltage Vout1 provided to an lower electrode layer, such as the lower electrode layer LE shown in FIG. 2, and the second output voltage Vout2 provided to a upper electrode layer, such as the upper electrode layer UE shown in FIG. 2, no electric field is applied to a liquid crystal layer, such as the liquid crystal layer LCL shown in FIG. 2, in the polarization control layer 600 (PCL). Accordingly, horizontally linearly polarized light is provided to a lens array, such as the lens array LSA shown in FIG. 2, so that a 2D image can be displayed in the first mode.

In addition, when it is determined that the image display mode is the second mode, based on the second logic level polarization control signal PCS, the polarization controller 500 generates and outputs the first output voltage Vout1 and the second output voltage Vout2 that have a voltage level difference that corresponds to a reference voltage difference. As described with reference to FIGS. 2 and 3B, in the second mode, since the first output voltage Vout1 provided to the lower electrode layer, such as the lower electrode layer LE shown in FIG. 2, and the second output voltage Vout2 provided to the upper electrode layer, such as the upper electrode layer UE shown in FIG. 2, have a voltage level difference that corresponds to the reference voltage difference, an electric field is applied to the liquid crystal layer, such as the liquid crystal layer LCL shown in FIG. 2, in the polarization control layer 600 (PCL). Accordingly, vertically polarized light is incident into the lens array, such as the lens array LSA shown in FIG. 2, as is. Light refracted in the lens array, such as the lens array LSA shown in FIG. 2, divides into an advancing path of light that corresponds to a right eye image and an advancing path of light that corresponds to a left eye image that converge on different foci, so that a 3D image is displayed.

Hereinafter, a configuration in which the polarization controller 500 generates the first output voltage Vout1 and the second output voltage Vout2, based on the polarization control signal PCS, will be described in more detail with reference to FIGS. 13 to 15.

Figure 13:
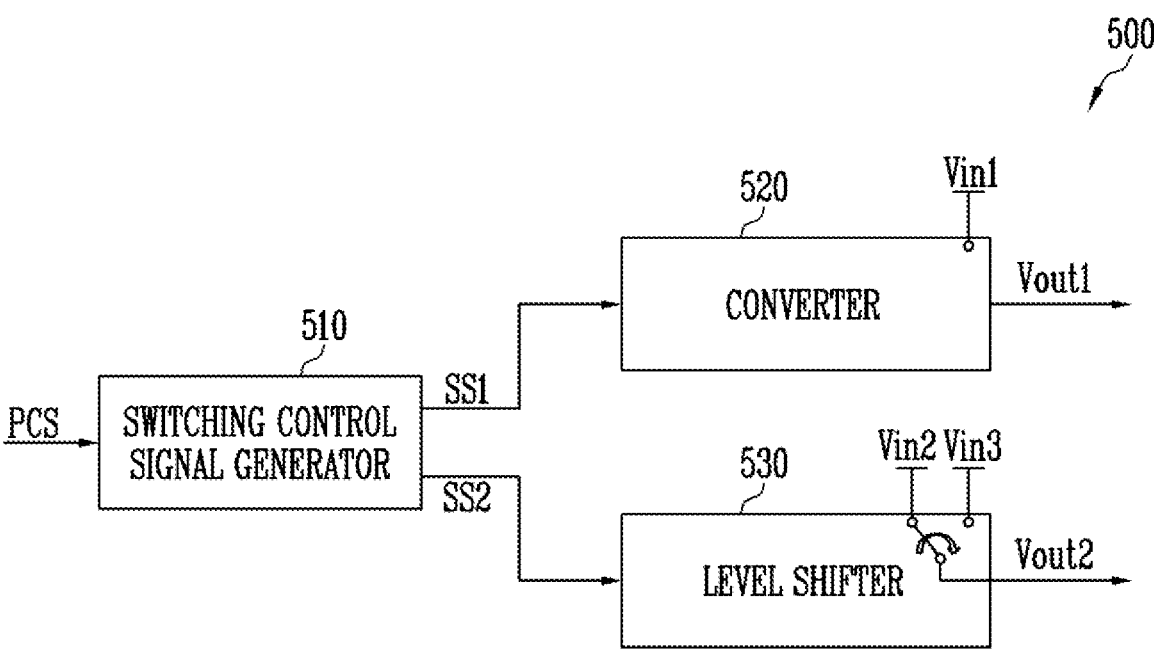
FIG. 13 is a block diagram of a polarization controller of a stereoscopic image display device shown in FIG. 12.

FIG. 13 is a block diagram of a polarization controller 500 included in a stereoscopic image display device 1000 shown in FIG. 12.

Referring to FIGS. 2, 3A, 3B, 12, and 13, in an embodiment, the polarization controller 500 includes a switching control signal generator 510, a converter 520, and a level shifter 530.

The switching control signal generator 510 receives the polarization control signal PCS, and generates a first switching control signal SS1 and a second switching control signal SS2, based on the polarization control signal PCS.

For example, the switching control signal generator 510 generates the first switching control signal SS1 and the second switching control signal SS2 that are used to control voltage levels of output (or driving) voltages respectively generated by the converter 520 and the level shifter 530 and that correspond to the image display mode, based on a logic level of the polarization control signal PCS.

The first switching control signal SS1 is provided to the converter 520, and the second switching control signal SS2 is provided to the level shifter 530.

The converter 520 generates a first output voltage Vout1 having a first voltage level or a second voltage level, based on the first switching control signal SS1 and the first input voltage Vin1. For example, when the image display mode is the first (or 2D image display) mode, the converter 520 receives the first input voltage Vin1, and generates the first output voltage Vout1 that has the first voltage level, based on the first switching control signal SS1. When the image display mode is the second (or 3D image display) mode, the converter 520 generates the first output voltage Vout1 that has the second voltage level, based on the first switching control signal SS1.

In an embodiment, the converter 520 includes a boost-converter. For example, the converter 520 is a DC-DC converter, and includes a boost-converter that generates and outputs the first output voltage Vout1 by converting the DC first input voltage Vin1 into an AC voltage, boosting the AC voltage, and converting the AC voltage back into a DC voltage. For example, the converter 520 is a boost-converter such as is known in the art, which includes a switching element, an inductor, a diode, etc. However, embodiments are not necessarily limited thereto, and the boost-converter in the converter 520 can be variously designed in other embodiments.

In an embodiment in which the converter 520 includes a boost-converter, a voltage level of the first output voltage Vout1 according to the image display mode will be described in detail with reference to FIG. 14.

In an embodiment, the converter 520 includes a buck-converter. For example, the converter 520 includes a polarity reversal type buck-converter. For example, the converter 520 is a DC-DC converter, and includes a polarity reversal type buck-converter that generates and outputs the first output voltage Vout1 by converting a DC first input voltage Vin1 received from an external source, such as an external power device, a battery, etc., into an AC voltage, boosting the AC voltage, and converting the AC voltage back into a DC voltage that has a polarity, such as a negative polarity, that differs from a polarity, such as a positive polarity, of the first input voltage Vin1. For example, the converter 520 is a polarity reversal type buck-converter as is known in the art, which includes a switching element, an inductor, a diode, etc. However, embodiments are not necessarily limited thereto, and the polarity reversal type buck-converter in the converter 520 may be variously designed in other embodiments.

In an embodiment in which the converter 520 includes a polarity reversal type buck-converter, a voltage level of the first output voltage Vout1 according to the image display mode will be described in detail with reference to FIG. 15.

The level shifter 530 generates a second output voltage Vout2 that has the first voltage level or a third voltage level, based on the second switching control signal SS2, the second input voltage Vint, and the third input voltage Vin3. For example, when the image display mode is the first (or 2D image display) mode, the level shifter 530 generates the second output voltage Vout2 that has the first voltage level, based on the second switching control signal SS2. When the image display mode is the second (or 3D image display) mode, the level shifter 530 generates the second output voltage Vout2 that has a voltage level that cyclically repeats between the first voltage level and the third voltage level, based on the second switching control signal SS2. As described with reference to FIGS. 2 and 3B, the first voltage level is lower than the second voltage level by the reference voltage difference, and the third voltage level is higher than the second voltage level by the reference voltage level.

In an embodiment, the level shifter 530 receives the second input voltage Vin2 that has the first voltage level and the third input voltage Vin3 that has the third voltage level, and generates the second output voltage Vout2 that has a voltage level that corresponds to the image display mode, based on the second switching control signal SS2.

For example, when the image display mode is the first mode, the level shifter 530 generates and outputs the second input voltage Vin2 at the first voltage level as the second output voltage Vout2. When the image display mode is the second mode, the level shifter 530 generates and outputs the second input voltage Vin2 at the first voltage level or the third input voltage Vin3 at the third voltage level as the second output voltage Vout2. For example, the level shifter 530 includes a level shifter circuit that includes a switching element, and outputs the second input voltage Vin2 at the first voltage level or the third input voltage Vin3 at the third voltage level as the second output voltage Vout2 according to an on/off state of the switching element, which corresponds to the logic level of the second switching control signal SS2. However, embodiments are not necessarily limited thereto, and the level shift circuit included in the level shifter 530 can be variously designed in other embodiments.

As described with reference to FIGS. 12 and 13, the polarization controller 500 of the stereoscopic image display device 1000 in accordance with the embodiments of the present disclosure includes the converter 520 and the level shifter 530 to provide an output voltage, such as the first output voltage Vout1 or the second output voltage Vout2, to the polarization control layer 600 (PCL), such as an upper electrode layer UE and a lower electrode layer LE. In particular, in the stereoscopic image display device 1000 in accordance with the embodiments of the present disclosure, when the image display mode is the second mode, the level shifter 530 cyclically changes the voltage level of the second output voltage Vout2 supplied to the upper electrode layer UE to prevent degradation of liquid crystal molecules LC in a liquid crystal layer LCL.

When the level shifter 530 is used, power consumption can be reduced as compared with other circuit components, such as an operational amplifier, etc., that can be used to cyclically change the voltage level of the output voltage.

For example, in a comparative example, when an operational amplifier is used to cyclically change the voltage level of the output voltage, the operational amplifier repeats a sourcing process and a sinking process to change the voltage level, and therefore, power consumption increases. In particular, when a change period of the voltage level is shortened, such as when the voltage level variable frequency increases, the power consumption of the operational amplifier increases.

On the other hand, the stereoscopic image display device 1000 in accordance with the embodiments of the present disclosure uses the level shifter 530, which has a low power consumption, to cyclically change the voltage level of the second output voltage Vout2 in the second mode, so that power consumption can be reduced.

Figure 14:
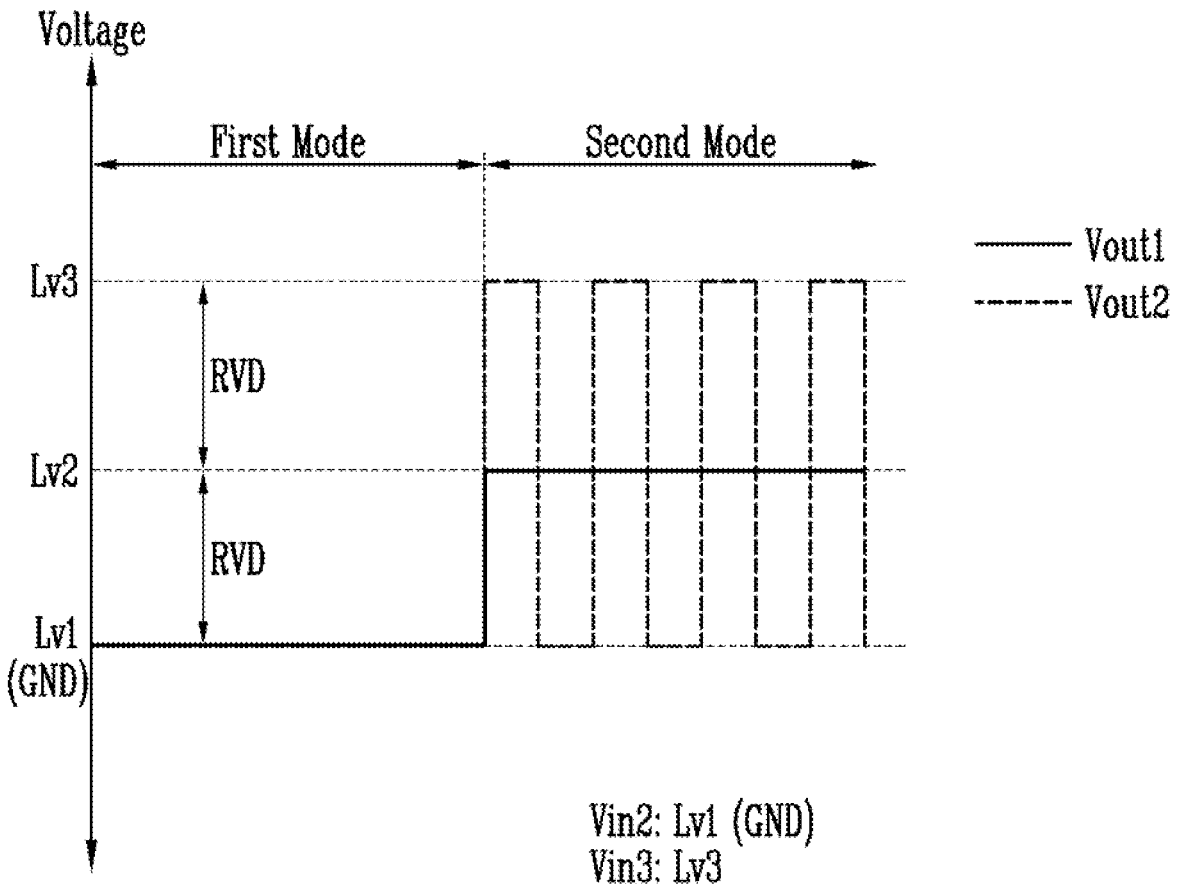
FIG. 14 is a waveform diagram that illustrates an operation of a polarization controller shown in FIG. 13.

FIG. 14 is a waveform diagram that illustrates an operation of a polarization controller 500 shown in FIG. 13.

Referring to FIGS. 2, 12, and 14, in an embodiment, a graph of the first output voltage Vout1 and the second output voltage Vout2 that are output from the polarization controller 500 and supplied to the polarization control layer 600 (PCL) when the stereoscopic image display device 1000 is operated in the first (or 2D image display) mode and the second (or 3D image display) mode is illustrated in FIG. 14.

FIG. 14 illustrates an embodiment in which the converter 520 in the polarization controller 500 includes a boost-converter, and shows a voltage level of the first output voltage Vout1 output from the converter 520 and a voltage level of the second output voltage Vout2 output from the level shifter 530.

In addition, in an embodiment in which the converter 520 in the polarization controller 500 includes the boost-converter, a first voltage level Lv1 is a ground voltage GND, a second voltage level Lv2 is higher than the first voltage level Lv1 by a reference voltage difference RVD, and a third voltage level Lv3 is higher than the second voltage level Lv2 by the reference voltage difference RVD.

In the first mode in which a 2D image is displayed, both the first output voltage Vout1 generated and output from the converter 520 and the second output voltage Vout2 generated and output from the level shifter 530 have the first voltage level Lv1.

For example, in an embodiment, an operation of the converter 520 is turned off in response the first switching control signal SS1 received in the first mode, so that the converter 520 generates and outputs the first output voltage Vout1, which has the first voltage level Lv1 equal to the ground voltage GND. For example, the first switching control signal SS1 provided to the converter 520 is an enable signal, and the operation of the converter 520 is turned off in response to the first switching control signal SS1 that corresponds to the first mode.

In addition, the level shifter 530 generates and outputs the second output voltage Vout2, which has the first voltage level Lv1 equal to the ground voltage GND, based on the second switching control signal SS2 provided in the first mode. For example, the level shifter 530 outputs the second input voltage Vint at the first voltage level Lv1 as the second output voltage Vout2.

As described above, when the first output voltage Vout1 and the second output voltage Vout2 have the same voltage level, such as the first voltage level Lv1, in the first mode, there is no voltage level difference between the second output voltage Vout2 provided to the upper electrode layer UE and the first output voltage Vout1 provided to the lower electrode layer LE as described with reference to FIGS. 2 and 3A. Hence, no electric field is applied to the liquid crystal layer LCL in the polarization control layer 600 (PCL). Accordingly, a 2D image can be displayed in the first mode.

In the second mode in which a 3D image is displayed, the first output voltage Vout1 generated and output from the converter 520 has the second voltage level Lv2, and the second output voltage Vout2 generated and output from the level shifter 530 has the first voltage level Lv1 or the third voltage level Lv3. For example, in the second mode, a voltage level of the second output voltage Vout2 cyclically repeats between the first voltage level Lv1 and the third voltage level Lv3, whose difference corresponds to the reference voltage RVD from the second voltage level Lv2 of the first output voltage Vout1, according to a predetermined cycle.

For example, the operation of the converter 520 is turned on in response to the first switching control signal SS1 provided in the second mode, so that the converter 520 generates and outputs first output voltage Vout1, which has the second voltage level Lv2 that higher than the first voltage level Lv1 by the reference voltage difference RVD. For example, the first switching control signal SS1 provided to the converter 520 is an enable signal, and the operation of the converter 520 is turned on in response to the first switching control signal SS1 that corresponds to the second mode. That is, in the second mode, the converter 520 outputs the first output voltage Vout1 at the second voltage level Lv2 by converting or boosting the first input voltage Vint.

In addition, the level shifter 530 generates and outputs the second output voltage Vout2 that has first voltage level Lv1 lower than the second voltage level Lv2 by the reference voltage difference RVD, or the second output voltage Vout2 that has third voltage level Lv3 higher than the second voltage level Lv2 by the reference voltage difference RVD, based on the second switching control signal SS2 provided in the second mode. For example, the level shifter 530 outputs the second input voltage Vint at the first voltage level Lv1 as the second output voltage Vout2 or the third input voltage Vin3 at the third voltage level Lv3 as the second output voltage Vout2, according to the predetermined cycle.

Figure 3B:
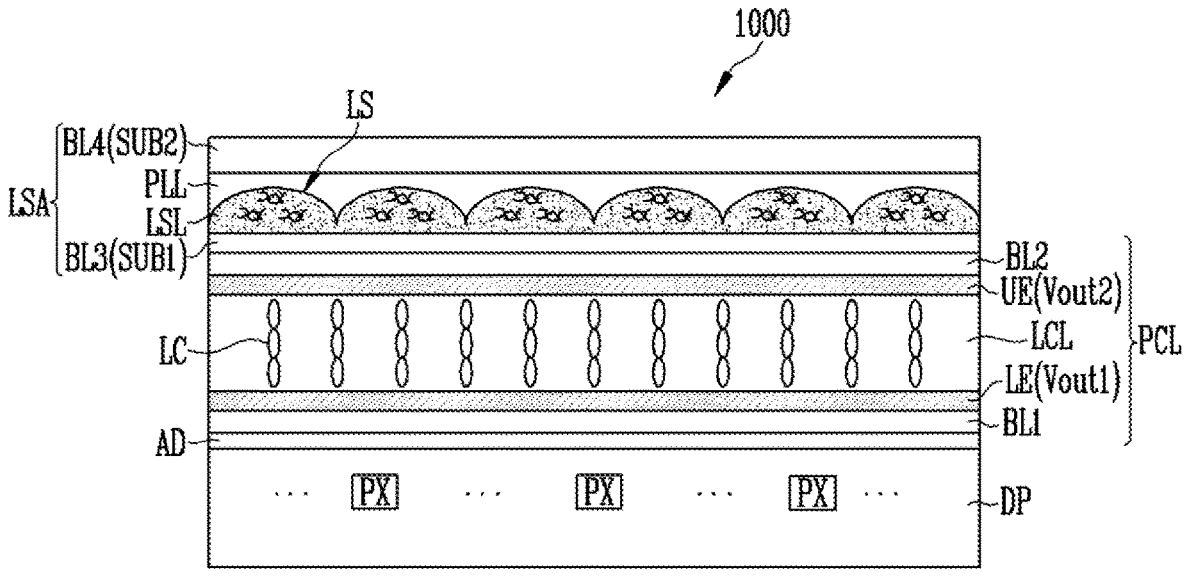
FIG. 3B illustrates a stereoscopic image display device shown in FIG. 2 being operated in a second mode.

As described above, in the second mode, when the first output voltage Vout1 and the second output voltage Vout2 have a voltage difference that corresponds to the reference voltage difference RVD, an electric field is applied to the liquid crystal layer LCL in the polarization control layer 600 (PCL) by a voltage level difference, such as the reference voltage difference RVD, between the second output voltage Vout2 provided to the upper electrode layer UE and the first output voltage Vout1 provided to the lower electrode layer LE as described with reference to FIGS. 2 and 3B. Accordingly, a 3D image can be displayed in the second mode.

In addition, as described with reference to FIGS. 2, 3B, and 13, when the voltage level of the second output voltage Vout2 output from the level shifter 530 to the upper electrode layer UE in the second mode cyclically varies according to the predetermined cycle, the direction of an electric field applied to the liquid crystal layer LCL is cyclically reversed, so that degradation of liquid crystal molecules LC can be prevented.

Figure 15:
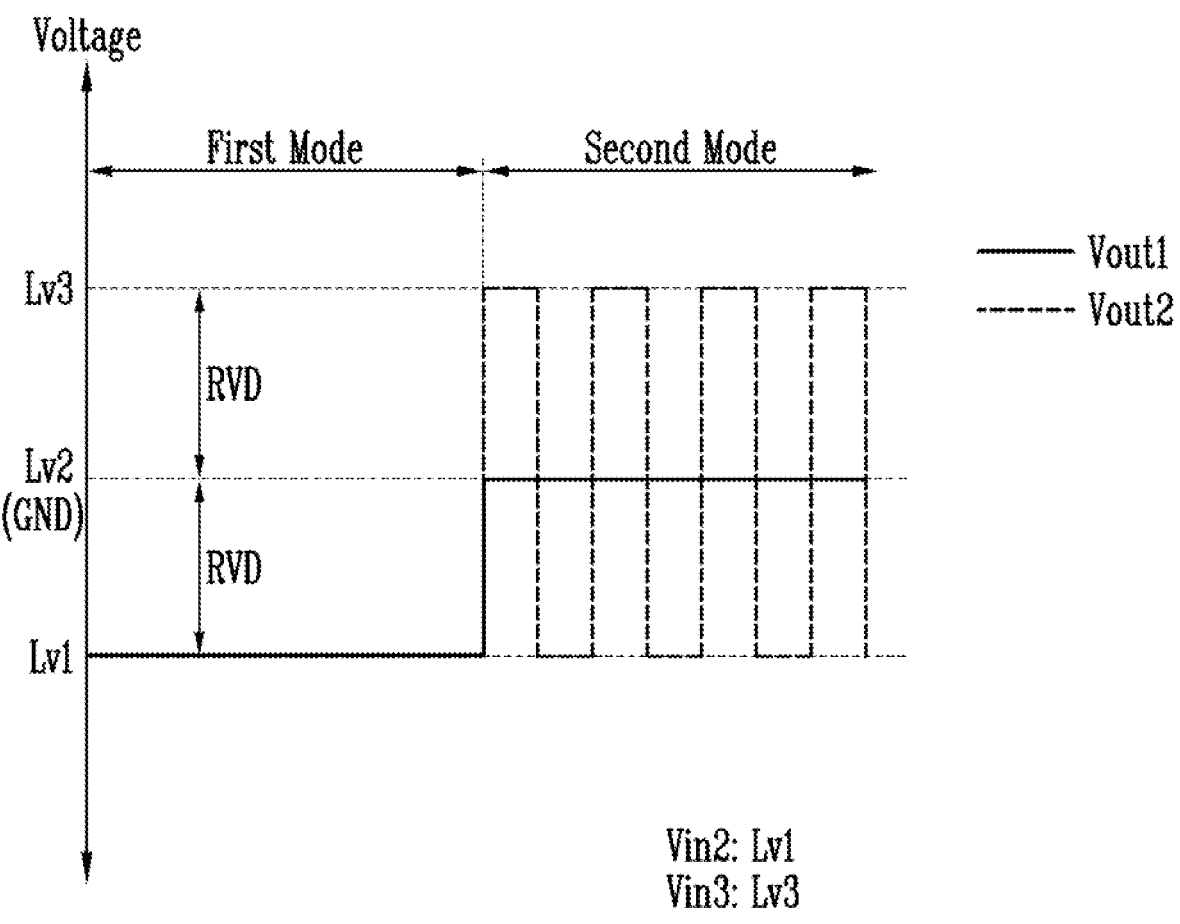
FIG. 15 is a waveform diagram that illustrating an operation of a polarization controller shown in FIG. 13.

FIG. 15 is a waveform diagram that illustrates an operation of a polarization controller 500 shown in FIG. 13.

Referring to FIGS. 2, 12, 13, and 15, in an embodiment, a graph of the first output voltage Vout1 and the second output voltage Vout2 that are output from the polarization controller 500 to the polarization control layer 600 (PCL) when the stereoscopic image display device 1000 is operated in the first (or 2D image display) mode and the second (or 3D image display) mode is illustrated in FIG. 15.

FIG. 15 illustrates an embodiment in which the converter 520 in the polarization controller 500 includes a buck-converter, and shows a voltage level of the first output voltage Vout1 output from the converter 520 and a voltage level of the second output voltage Vout2 output from the level shifter 530.

In addition, in an embodiment in which the converter 520 in the polarization controller 500 includes a buck-converter, a second voltage level Lv2 has a ground voltage GND level, a first voltage level Lv1 has a voltage level, such as a negative voltage level, that is lower than the second voltage level Lv2 by a reference voltage difference RVD, and a third voltage level Lv3 has a voltage level, such as a positive voltage level, that is higher than the second voltage level Lv2 by the reference voltage difference RVD.

In the first mode in which a 2D image is displayed, both the first output voltage Vout1 generated and output from converter 520 and the second output voltage Vout2 generated and output from the level shifter 530 have the first voltage level Lv1.

For example, an operation of the converter 520 is turned on in response to the first switching control signal SS1 provided in the first mode, so that the first output voltage Vout1 at the first voltage level Lv1 is generated and output from the converter 520. For example, the first switching control signal SS1 provided to the converter 520 is an enable signal, and the operation of the converter 520 is turned on in response to the first switching control signal SS1 that corresponds to the first mode. For example, in the first mode, the converter 520 outputs the first output voltage Vout1 at the first voltage level Lv1 that is lower than the ground voltage GND (level second voltage level Lv2) by converting the first input voltage Vint, for example, by dropping the first input voltage Vint and reversing the polarity of the first input voltage Vint.

In addition, the level shifter 530 generates and outputs the second output voltage Vout2 at the first voltage level Lv1, based on the second switching control signal SS2 provided in the first mode. For example, the level shifter 530 outputs the second input voltage Vint at the first voltage level Lv1 as the second output voltage Vout2.

As described above, in the first mode, when the first output voltage Vout1 and the second output voltage Vout2 have the same voltage level, such as the first voltage level Lv1, there is no voltage level difference between the second output voltage Vout2 provided to the upper electrode layer UE and the first output voltage Vout1 provided to the lower electrode layer LE as described with reference to FIGS. 2 and 3A. Hence, no electric field is applied to the liquid crystal layer LCL in the polarization control layer 600 (PCL). Accordingly, a 2D image can be displayed in the first mode.

In the second mode in which a 3D image is displayed, the first output voltage Vout1 generated and output from the converter 520 is at the second voltage level Lv2, and the second output voltage Vout2 generated and output from the level shifter 530 may have the first voltage level Lv1 or the third voltage level Lv3. For example, in the second mode, the second output voltage Vout2 has a voltage level that cyclically repeats between the first voltage level Lv1 and the third voltage level Lv3, which have a difference that corresponds to the reference voltage difference RVD from the second voltage level Lv2 of the first output voltage Vout1, according to a predetermined cycle.

For example, the operation of the converter 520 is turned off in response to the first switching control signal SS1 provided in the second mode, so that the first output voltage Vout1 at the ground voltage GND (level second voltage level Lv2) is generated and output from the converter 520. For example, the first switching control signal SS1 provided to the converter 520 is an enable signal, and the operation of the converter 520 is turned off in response to the first switching control signal SS1 that corresponds to the second mode.

In addition, the level shifter 530 generates and outputs the second output voltage Vout2 at the first voltage level Lv1 that is lower than the second voltage level Lv2 by the reference voltage difference RVD or at the third voltage level Lv3 that is higher than the second voltage level Lv2 by the reference voltage difference RVD, based on the second switching control signal SS2 provided in the second mode. For example, the level shifter 530 outputs as the second output voltage Vout2 either the second input voltage Vint at the first voltage level Lv1 or as the third input voltage Vin3 at the third voltage level Lv3, according to the predetermined cycle.

As described above, in the second mode, when the first output voltage Vout1 and the second output voltage Vout2 have a voltage difference that corresponds to the reference voltage difference RVD, an electric field is applied to the liquid crystal layer LCL in the polarization control layer 600 (PCL) by a voltage level difference, such as the reference voltage difference RVD, between the second output voltage Vout2 provided to the upper electrode layer UE and the first output voltage Vout1 provided to the lower electrode layer LE as described with reference to FIGS. 2 and 3B. Accordingly, a 3D image can be displayed in the second mode.

In addition, as described with reference to FIGS. 2, 3B, and 13, when the voltage level of the second output voltage Vout2 output from the level shifter 530 to the upper electrode layer UE in the second mode cyclically varies according to the predetermined cycle, the direction of an electric field applied to the liquid crystal layer LCL cyclically reverses, so that degradation of liquid crystal molecules LC can be prevented.

In accordance with embodiments of the present disclosure, a stereoscopic image display device includes a level shifter and a converter that are used to generate and output a driving (output) voltage to a polarization control layer. Accordingly, power consumption can be reduced or minimized.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of embodiments of the present disclosure as set forth in the claims.

What is claimed is:

1. A stereoscopic image display device, comprising:
a display panel that includes pixels;
a polarization controller that generates a first output voltage and a second output voltage; and
a polarization control layer that controls a path of light emitted by the display panel, based on the first output voltage and the second output voltage,
wherein the first output voltage has a first voltage level in a first mode, and has a second voltage level that differs from the first voltage level in a second mode,
wherein the second output voltage has the first voltage level in the first mode, and has the first voltage level or a third voltage level that differs from the first and second voltage levels in the second mode, and
wherein the polarization controller includes:
a switching control signal generator that generates a first switching control signal and a second switching control signal;
a converter that receives the first switching control signal from the switching control signal generator and generates the first output voltage, based on the first switching control signal; and
a level shifter that receives the second switching control signal from the switching control signal generator and generates the second output voltage, based on the second switching control signal.

2. The stereoscopic image display device of claim 1, wherein
a 2D image is displayed by the stereoscopic image display device in the first mode, and
a 3D image is displayed by the stereoscopic image display device in the second mode.

3. The stereoscopic image display device of claim 1, wherein
the second voltage level is higher than the first voltage level by a reference voltage difference, and the third voltage level is higher than the second voltage level by the reference voltage difference.

4. The stereoscopic image display device of claim 3, wherein the first voltage level is a ground voltage.

5. The stereoscopic image display device of claim 3, wherein the second voltage level is a ground voltage.

6. The stereoscopic image display device of claim 1, wherein, in the second mode, a voltage level of the second output voltage cyclically repeats between the first voltage level and the third voltage level according to a predetermined cycle.

7. The stereoscopic image display device of claim 1, wherein the converter includes a boost-converter.

8. The stereoscopic image display device of claim 7, wherein the converter:
generates the first output voltage at the first voltage level that equals a ground voltage, based on the first switching control signal received in the first mode; and
generates the first output voltage at the second voltage level by converting a first input voltage, based on the first switching control signal received in the second mode.

9. The stereoscopic image display device of claim 8, wherein the first switching control signal is an enable signal, and
wherein the converter is turned off in response to the first switching control signal received in the first mode, and is turned on in response to the first switching control signal received in the second mode.

10. The stereoscopic image display device of claim 1, wherein the converter includes a buck-converter.

11. The stereoscopic image display device of claim 10, wherein the converter:
generates the first output voltage at the first voltage level by converting a first input voltage, based on the first switching control signal received in the first mode; and
generates the first output voltage at the second voltage level that equals a ground voltage, based on the first switching control signal received in the second mode.

12. The stereoscopic image display device of claim 11, wherein the first switching control signal is an enable signal, and
wherein the converter is turned on in response to the first switching control signal received in the first mode, and is turned off in response to the first switching control signal received in the second mode.

13. The stereoscopic image display device of claim 1, wherein the level shifter:
generates a second input voltage at the first voltage level as the second output voltage, based on the second switching control signal received in the first mode; and
generates the second input voltage at the first voltage level or a third input voltage at the third voltage level as the second output voltage, based on the second switching control signal received in the second mode.

14. An stereoscopic image display device, comprising:
a display panel that includes pixels;
a polarization control layer disposed on the display panel, wherein the polarization control layer controls a path of light emitted by the display panel; and
a polarization controller that controls the polarization control layer,
wherein the polarization control layer includes:
a first electrode layer that receives a first output voltage;
a second electrode layer that faces the first electrode layer and receives a second output voltage; and a liquid crystal layer disposed between the first electrode layer and the second electrode layer, wherein the liquid crystal layer includes liquid crystal molecules whose alignment direction is controlled according to a voltage level of each of the first output voltage and the second output voltage, wherein the first output voltage has a first voltage level in a first mode, and has a second voltage level that differs from the first voltage level in a second mode, wherein the second output voltage has the first voltage level in the first mode, and has the first voltage level or a third voltage level that differs from the first and second voltage levels in the second mode, and wherein the polarization controller includes:

a switching control signal generator that generates a first switching control signal and a second switching control signal;

a converter that receives the first switching control signal from the switching control signal generator and generates the first output voltage, based on the first switching control signal; and a level shifter that receives the second switching control signal from the switching control signal generator and generates the second output voltage, based on the second switching control signal.

15. The stereoscopic image display device of claim 14, wherein the second voltage level is higher than the first voltage level by a reference voltage difference, and the third voltage level is higher than the second voltage level by the reference voltage difference.

16. The stereoscopic image display device of claim 15, wherein the first voltage level is a ground voltage.

17. The stereoscopic image display device of claim 15, wherein the second voltage level is a ground voltage.

18. The stereoscopic image display device of claim 14, wherein, in the second mode, a voltage level of the second output voltage cyclically repeats between the first voltage level and the third voltage level according to a predetermined cycle.

19. The stereoscopic image display device of claim 15, wherein, in the first mode, the liquid crystal molecules are aligned to linearly polarize light emitted by the display panel in a horizontal direction, and wherein, in the second mode, the liquid crystal molecules are aligned to linearly polarize light emitted by the display panel in a vertical direction by means of an electric field that corresponds to the reference voltage difference.

\* \* \* \* \*